US010949918B2

(12) United States Patent
Fidanza et al.

(10) Patent No.: US 10,949,918 B2
(45) Date of Patent: Mar. 16, 2021

(54) SYSTEM AND METHOD FOR ISSUING A LOAN TO A CONSUMER DETERMINED TO BE CREDITWORTHY AND GENERATING A BEHAVIORAL PROFILE OF THAT CONSUMER

(71) Applicant: MO TECNOLOGIAS, LLC, Bogota (CO)

(72) Inventors: Paolo Fidanza, Bogota (CO); Andrii Kurinnyi, Los Angeles, CA (US)

(73) Assignee: MO TECNOLOGIAS, LLC, Bogota (CO)

( * ) Notice: Subject to any disclaimer, the term of this patent is extended or adjusted under 35 U.S.C. 154(b) by 432 days.

(21) Appl. No.: 15/847,991

(22) Filed: Dec. 20, 2017

(65) Prior Publication Data
US 2018/0349991 A1    Dec. 6, 2018

Related U.S. Application Data

(60) Provisional application No. 62/543,443, filed on Aug. 10, 2017, provisional application No. 62/515,053, filed on Jun. 5, 2017.

(51) Int. Cl.
*G06Q 40/02* (2012.01)
*G06Q 20/10* (2012.01)
(Continued)

(52) U.S. Cl.
CPC ......... *G06Q 40/025* (2013.01); *G06Q 20/102* (2013.01); *G06Q 20/3224* (2013.01);
(Continued)

(58) Field of Classification Search
CPC .............. G06Q 40/025; G06Q 20/102; G06Q 20/3224; G06Q 20/363; G06Q 20/403; G06Q 20/405
See application file for complete search history.

(56) References Cited

U.S. PATENT DOCUMENTS 8,181,867 B1    5/2012  Bierbaum et al.
8,799,150 B2    8/2014  Annappindi
(Continued)

FOREIGN PATENT DOCUMENTS

WO    2016/126464    8/2016

OTHER PUBLICATIONS

Lang et al., "Understanding Consumer Behavior With Recurrent Neural Networks," International Workshop on Machine Learning Methods for Recommender Systems (MLRec@SDM); 2017; 8 pages.

*Primary Examiner* — Robert R Niquette
*Assistant Examiner* — Pierre L Maccagno
(74) *Attorney, Agent, or Firm* — Allen, Dyer, Doppelt + Gilchrist, P.A.

(57) ABSTRACT

A system and method determines the creditworthiness of a consumer and issues a loan and generates a behavioral profile for that consumer. An initial set of data is acquired from the consumer that includes non-identification attributes without obtaining a full name, a credit card number, a passport number, or a government issued ID number that allows identification of the consumer. A user ID number matches the initial set of data to a physical user in a transaction database. A credit score based on the average credit among a plurality of user profiles is matched to determine a maximum credit for the consumer. A loan is credited and a behavioral profile is generated based on the consumer check-ins and location and correlating periodic location patterns to loan and transactional activities.

10 Claims, 40 Drawing Sheets

(51) Int. Cl.
*G06Q 20/32* (2012.01)
*G06Q 20/36* (2012.01)
*G06Q 20/40* (2012.01)

(52) U.S. Cl.
CPC ......... *G06Q 20/363* (2013.01); *G06Q 20/403* (2013.01); *G06Q 20/405* (2013.01)

(56) References Cited

U.S. PATENT DOCUMENTS

| | | | |
|---|---|---|---|
| 9,070,088 B1* | 6/2015 | Baveja | G06N 5/048 |
| 2008/0033869 A1 | 2/2008 | Steele et al. | |
| 2008/0221972 A1* | 9/2008 | Megdal | G06Q 40/02 705/7.29 |
| 2008/0319895 A1 | 12/2008 | Lazerson | |
| 2009/0112744 A1 | 4/2009 | Park et al. | |
| 2012/0116944 A1 | 5/2012 | Dicarlo | |
| 2012/0239553 A1* | 9/2012 | Gonen | G06Q 40/02 705/38 |
| 2013/0132360 A1* | 5/2013 | Kuznetsov | G06Q 40/02 707/706 |
| 2013/0159165 A1* | 6/2013 | Marlowe-Noren | G06Q 40/02 705/38 |
| 2013/0185189 A1 | 7/2013 | Stewart | |
| 2013/0226777 A1 | 8/2013 | Hu et al. | |
| 2014/0067650 A1* | 3/2014 | Gardiner | G06Q 40/025 705/38 |
| 2015/0019290 A1* | 1/2015 | Downton | G06Q 30/0202 705/7.31 |
| 2015/0243138 A1 | 8/2015 | Arnone et al. | |
| 2016/0125528 A1* | 5/2016 | Brown | G06Q 40/025 705/38 |
| 2016/0203551 A1* | 7/2016 | Tutte | G06Q 40/025 705/38 |
| 2016/0232546 A1 | 8/2016 | Ranft et al. | |
| 2016/0232606 A1* | 8/2016 | Chauhan | G06Q 40/025 |
| 2017/0032458 A1 | 2/2017 | Dembo | |
| 2017/0032460 A1* | 2/2017 | Szollar | G06Q 40/025 |
| 2017/0061535 A1 | 3/2017 | Williams | |
| 2019/0073676 A1* | 3/2019 | Wang | G06Q 40/025 |

\* cited by examiner

CONSULT LOAN
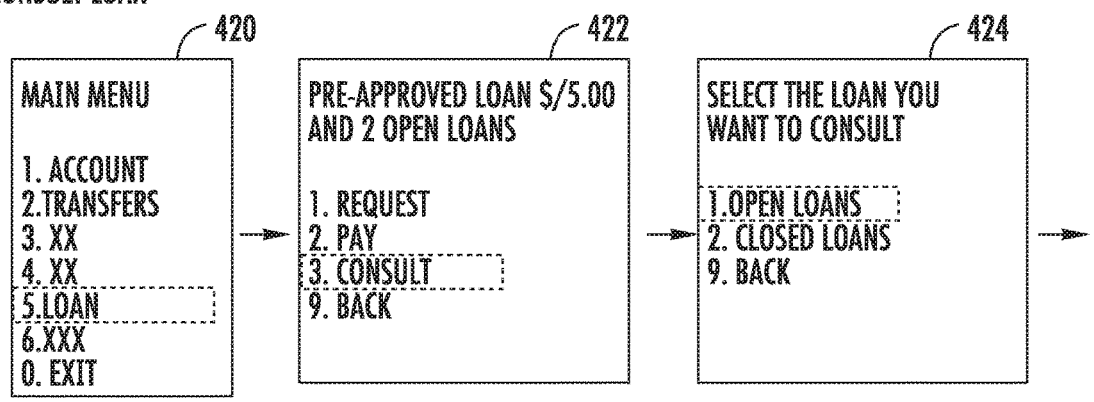
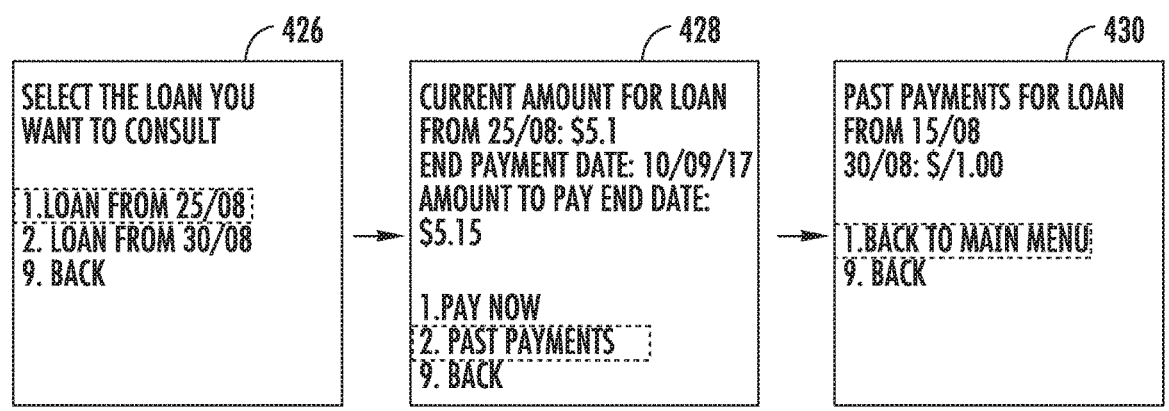
FIG. 15

FIG. 16

PAY LOAN

```
┌─────────────────────────┐        ┌─────────────────────────┐
│       PAY LOAN          │        │       PAY LOAN          │
├─────────────────────────┤        ├─────────────────────────┤
│  ┌───────────────────┐  │ 460    │  ┌───────────────────┐  │ 462
│  │  LOAN 1    $500   │  │        │  │ PAYMENT SUCCESSFUL│  │
│  └───────────────────┘  │        │  │ TRANSACTION NUMBER:│ │
│                         │        │  │ 2050010           │  │
│  ┌───────────────────┐  │        │  │ DATE:25/08/2017   │  │
│  │ AMOUNT    $500    │  │        │  │ TIME:13:30        │  │
│  │ DATE   12/07/17   │  │        │  │ AUTHORIZATION     │  │
│  │ INTEREST   $50    │  │        │  │ NUMBER: 09        │  │
│  │ TOTAL TO PAY $550 │  │        │  │ AMOUNT PAID: $550 │  │
│  └───────────────────┘  │        │  └───────────────────┘  │
│  ┌────────┐ ┌────────┐  │        │                         │
│  │PAY TOTAL│ │ OTHER │  │        │       ┌──────┐          │
│  │ AMOUNT │ │AMOUNT │  │        │       │ EXIT │          │
│  └────────┘ └────────┘  │        │       └──────┘          │
│     AMOUNT    $550      │        │                         │
│        ┌─────┐          │        │                         │
│        │ PAY │          │        │                         │
│        └─────┘          │        │                         │
└─────────────────────────┘        └─────────────────────────┘
```

*FIG. 18*

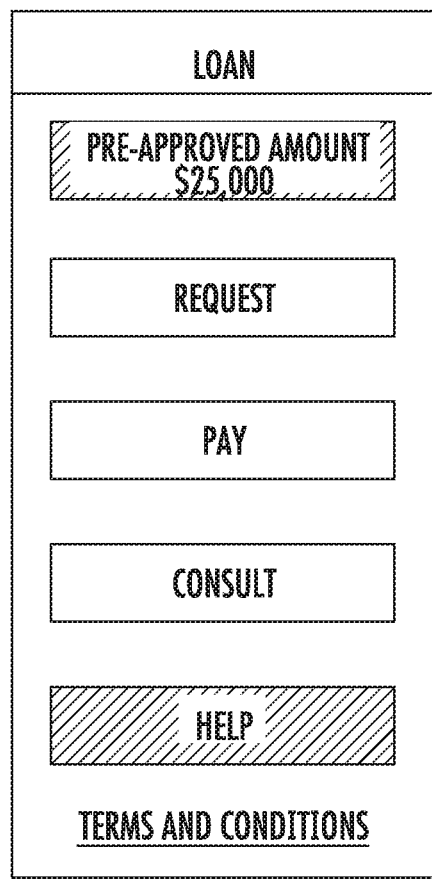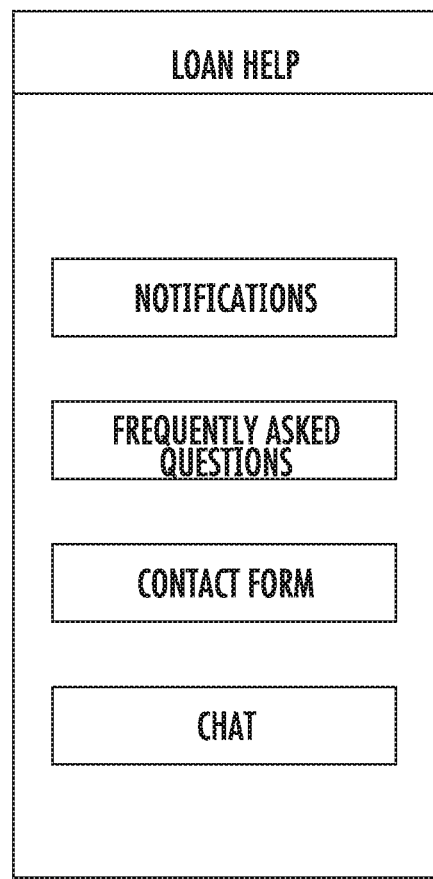
FIG. 21

HELP - CONTACT FORM

| LOAN HELP | LOAN HELP |
|---|---|
| NOTIFICATIONS | CONTACT FORM |
| FREQUENTLY ASKED QUESTIONS | NAME: |
| CONTACT FORM | E-MAIL: |
| CHAT | MESSAGE: |
| | CANCEL  SEND |

CONSULT: ALL LOANS

REQUEST | CONSULT | PAY | HELP | HISTORY

STATUS OF YOUR OPEN LOANS

SELECT THE LOAN YOU WANT TO CONSULT
-ALL YOUR OPEN LOANS

S/40
REQUESTED AMOUNT

S/4
LOAN COSTS

S/8
PAYMENTS TO DATE

S/36
PENDING AMOUNT

15/12/2017
FINAL PAYMENT DATE

*FIG. 29*

CONSULT: SELECT A LOAN

REQUEST | CONSULT | PAY | HELP | HISTORY

STATUS OF YOUR OPEN LOANS

SELECT THE LOAN YOU WANT TO CONSULT
- ALL YOUR OPEN LOANS
- LOAN REQUESTED 15/11/17
- LOAN REQUESTED 30/10/2017

S/40
REQUESTED AMOUNT

S/4
LOAN COSTS

S/8
PAYMENTS TO DATE

S/36
PENDING AMOUNT

15/12/2017
FINAL PAYMENT DATE

FIG. 30

CONSULT: SELECTED LOAN

REQUEST | CONSULT | PAY | HELP | HISTORY

STATUS OF YOUR OPEN LOANS

LOAN REQUESTED 15/11/2017

| S/30 | S/3 |
| REQUESTED AMOUNT | LOAN COSTS |

| S/8 | S/25 |
| PAYMENTS TO DATE | PENDING AMOUNT |

15/12/2017
FINAL PAYMENT DATE

| DATE | PAYMENT | NEW PENDING AMOUNT |
| 20/11/2017 | S/8 | S/25 |

FIG. 31

PAY: SELECTED LOAN

REQUEST　　CONSULT　　PAY　　HELP　　HISTORY

PAY YOUR LOANS

REMEMBER THAT YOU CAN ORDER PARTIAL PAYMENTS AT ANY TIME BEFORE THE FINAL PAYMENT DATE!

SELECT THE LOAN YOU WANT TO PAY

LOAN REQUESTED 15/11/17

LOAN REQUESTED 15/11/17

AMOUNT TO PAY TODAY　　S/25

10

PENDING AMOUNT　　S/15

KEEP IN MIND THAT THE AMOUNT YOU WANT TO PAY TOWARDS YOUR LOAN SHOULD BE AVAILABLE IN YOUR MAIN ACCOUNT AT THE TIME OF THE PAYMENT

PAY

FIG. 33

HELP

REQUEST　　　　CONSULT　　　　PAY　　　　////HELP////　　　　HISTORY

PLEASE SEND US YOUR QUESTION AND WE WILL GET BACK TO YOU SHORTLY

SEND US YOUR QUESTION

FREQUENTLY ASKED QUESTIONS

» WHO IS MO?

MO IS A TECHNOLOGICAL COMPANY SPECIALIZED IN ISSUING NANO AND MICRO-LOANS, USING AN INNOVATIVE METHOD FOR CREDIT SCORING. MO OFFERS PRE-APPROVED LOANS TO THE CUSTOMERS OF XXX.

» WHAT DOES IT MEAN TO HAVE PRE-APPROVED LOAN?

IT MEANS THAT WE HAVE DONE AN INITIAL EVALUATION OF YOUR RISK PROFILE BASED ON WHICH WE HAVE DETERMINED THE MAXIMUM AMOUNT YOU CAN REQUEST FOR YOUR LOAN

HOW CAN I REQUEST THE LOAN?

WHAT IS THE MAX AMOUNT I CAN REQUEST?

WHAT IS THE COST OF THE LOAN?

*FIG. 35*

HELP

REQUEST    CONSULT    PAY    HELP    HISTORY

PLEASE SEND US YOUR QUESTION AND WE WILL GET BACK TO YOU SHORTLY
SEND US YOUR QUESTION

YOUR NAME

YOUR E-MAIL

YOUR MESSAGE

CANCEL    SEND

*FIG. 36*

HISTORY: SELECTED LOAN

REQUEST　　　　CONSULT　　　　PAY　　　　HELP　　　　HISTORY

CLOSED LOANS
SELECT THE LOAN YOU WANT TO CONSULT

LOAN REQUESTED 16/09/2017

S/30
REQUESTED AMOUNT

S/33
PAID AMOUNT

16/10/2017
PAYMENT DATE

DATE
16/10/2017

PAYMENT
S/33

NEW PENDING AMOUNT
S/0

REQUEST CLOSED LOAN CERTIFICATE

*FIG. 38*

SYSTEM AND METHOD FOR ISSUING A LOAN TO A CONSUMER DETERMINED TO BE CREDITWORTHY AND GENERATING A BEHAVIORAL PROFILE OF THAT CONSUMER

PRIORITY APPLICATION(S)

This application is based upon provisional application Ser. No. 62/543,443 filed Aug. 10, 2017, and based upon provisional application Ser. No. 62/515,053 filed Jun. 5, 2017, the disclosures which are hereby incorporated by reference in their entirety.

FIELD OF THE INVENTION

The present invention relates to the field of mobile banking, and more particularly, this invention relates to a system and method for determining the creditworthiness of individuals or entities, issuing a loan, and generating a behavioral profile while enhancing computer processing and system operation and enhancing interoperation among databases.

BACKGROUND OF THE INVENTION

Mobile users may now use mobile devices, such as mobile wireless communications devices, i.e., mobile phones, pads, personal computers, and notebook computers, to receive funds, transfer funds, pay bills, and buy different goods using a platform such as an e-wallet or other hosting transactional application such as Uber, Facebook, eBay or other service. An e-wallet is also known as an electronic wallet, and in one aspect, it is a digital wallet that operates with different systems, including Windows®, Apple®, and other mobile platforms. The e-wallet may securely store passwords, credit card numbers, and other personal information using, for example, 256-bit AES encryption. Data is synchronized with an e-wallet desktop and selected mobile versions provided. Digital wallets allow an individual to make electronic transactions and an individual's bank account can be linked to the digital wallet. Other data pertinent to the e-wallet application may include a driver's license, health card, loyalty card, or other identification cards and documents stored on the mobile device. Sometimes the user's mobile telephone number serves as a unique identifier and short messaging service (SMS) may be used for mobile money transactions.

An example of such a loan processing system is disclosed in U.S. Patent Publication No. 2012/0239553 that provides a method to process and fund short-term loans for consumers. This loan system links a mobile credit storage facility amount to a mobile device associated with a user. An application for a short-term loan from the consumer is received through the mobile device and the entity grants or rejects approval of the short-term loan. Different identity information can be used such as the mobile device identification number associated with a user, a legal name and a social security number. The identification information may be used to record or establish a credit history and process transactions.

In this type of loan processing system, a user is not able to stay anonymous because identity information such as the name, social security number and the credit/debit card information of the user as a consumer are required to make a decision of whether a short-term or other loan should be granted or denied. Requiring such personal data and processing it may be time consuming and the processing at different servers and databases may add to the complexity and processing overhead. More efficient ways to enhance processing speed and efficiency without requiring the retrieval and processing of extensive personal data, especially for smaller nano and micro-loans, is desirable.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

A method of determining the creditworthiness and issuing loans to consumers and generating a behavioral profile of the consumers comprises connecting a mobile wireless communications device of a consumer via a wireless communications network to a loan issuance server having a communications module, controller and transaction database connected thereto. The method includes acquiring at the loan issuance server an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The method includes randomly generating at the loan issuance server a user ID number that matches the initial set of data that had been acquired about the consumer and storing the initial set of data and user ID number corresponding to the consumer in the transaction database as a user profile. The method further includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and a loan approval code is transmitted from the loan issuance server to the wireless communications device of the consumer to initiate an application programming interface (API) on the mobile wireless communications device of the consumer to confirm or enter a value of a loan to be made. The method includes receiving back from the consumer the confirmation or value of the loan to be made and an indication of how it is to be dispersed and in response, crediting the e-wallet of the consumer or paying a bill associated with an account of the consumer in the value of the loan. A behavioral profile for the consumer is generated based on the consumer location and check-ins to at least one of the e-wallet and the loan issuance server and further correlating periodic location patterns to loan and transactional activities.

The method may further comprise generating the behavioral profile using a customer conversation modeling or a multi-threaded analysis or any combination thereof. The method may further comprise generating the behavioral profile based on consumer segmentation with consumer information provided via the contents of each transaction and using affinity and purchase path analysis to identify products that sell in conjunction with each other depending on promotional and seasonal basis and linking between purchases over time.

The consumer check-ins and location for a consumer may be matched against a known-locations database comprising data regarding stores, private locations, public places and transaction data and correlating periodic location patterns to loan and transactional activities. The method may comprise predicting by consumer profile and periodicity, loan disbursement patterns, use of loans, loan repayments, and transaction activities. The method may comprise connecting the mobile wireless communications device of the consumer to the wireless communications network and the loan issuance server via the e-wallet and storing information in the transaction database about consumers that subscribe to an e-wallet and their transactions and displaying an application programming interface (API) on the mobile wireless communications device, wherein the consumer interacts with the e-wallet via the API on the mobile wireless communications device.

The non-identification attributes may comprise the gender, age, location, phone type, and cellular operator. The method may comprise transmitting the maximum credit via the API to the e-wallet that is tagged with the randomly generated user ID number, matching the user ID number to the actual consumer, and adding new attributes to the consumer and crediting a loan to the e-wallet for the consumer. In response to receiving the loan approval code, the consumer accesses at least one API screen on the mobile wireless communications device and enters data indicative of the value of the loan to be made and transmits that data to the loan issuance server to obtain the loan.

A method of determining the creditworthiness and issuing loans to consumers comprises connecting a mobile wireless communications device of a consumer via a wireless communications network to a loan issuance server having a communications module, controller and transaction database connected thereto. The method includes acquiring at the loan issuance server an initial set of data from at least one of an electronic wallet (e-wallet) of the consumer and public data sources containing data about the consumer, wherein the initial set of data includes non-identification attributes of the consumer without obtaining a full name, a credit card number, a passport number, or a government issued ID number that allows identification of the consumer. The method further includes randomly generating at the loan issuance server a user ID number that matches the initial set of data that had been acquired about the consumer and storing the initial set of data and user ID number corresponding to the consumer in the transaction database as a user profile. The method includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and transmitting a loan approval code from the loan issuance server to the wireless communications device of the consumer to initiate an application programming interface (API) on the mobile wireless communications device of the consumer to confirm or enter a value of a loan to be made and receiving back from the consumer the confirmation or value of the loan to be made and an indication of how it is to be dispersed. In response, the e-wallet of the consumer is credited or a bill associated with an account of the consumer is paid in the value of the loan.

A system of determining the creditworthiness and issuing loans to consumers comprises a loan issuance server having a communications module, controller and transaction database connected thereto. A wireless communications network is connected to the loan issuance server. The controller and communications module are operative with each other to communicate with a consumer operating a wireless communications device via the wireless communications network and acquire an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The controller is further configured to randomly generate a user ID number that matches the initial set of data that had been acquired about the consumer and store the initial set of data and user ID number corresponding to the consumer in the transaction database as a user profile. The controller generates a credit score based on the average credit among a plurality of user profiles stored within the transaction database and matches a data attribute string based on the user ID number and the initial set of data to determine a maximum allowed credit for the consumer. The controller approves a loan based on the maximum allowed credit of the consumer and configures the communications module to transmit a loan approval code to the wireless communications device of the consumer to initiate an application programming interface (API) on the mobile wireless communications device of the consumer to confirm or enter a value of a loan to be made and receive back from the consumer the confirmation or value of the loan to be made and an indication of how it is to be dispersed. In response, the controller credits the e-wallet of the consumer or pays a bill associated with an account of the consumer in the value of the loan.

The controller is configured to generate a behavioral profile for the consumer based on the consumer location and check-ins to at least one of the e-wallet and the loan issuance server and further correlate periodic location patterns to loan and transactional activities. The controller is configured to generate the behavioral profile using a customer conversation modeling or a multi-threaded analysis or any combination thereof. The controller is configured to generate the behavioral profile based on consumer segmentation with consumer information provided via the contents of each transaction and using affinity and purchase path analysis to identify products that sell in conjunction with each other depending on promotional and seasonal basis and linking between purchases over time. The controller is configured to match the consumer check-ins to at least one of the e-wallet and the loan issuance server and the location for a consumer against a known-locations database comprising data regarding stores, private locations, public places and transaction data and correlating periodic location patterns to loan and transactional activities. The non-identification attributes comprises the gender, age, location, phone type, and cellular operator.

BRIEF DESCRIPTION OF THE DRAWINGS

Other objects, features and advantages of the present invention will become apparent from the detailed description of the invention which follows, when considered in light of the accompanying drawings in which:

FIG. 15 are example wire frames of a USSD menu for consulting a loan.

FIG. 16 are example wire frames of an application menu on a mobile phone for requesting a pre-approved loan.

FIG. 18 are example wire frames of the application menu for paying a loan.

FIG. 21 are example wire frames of the application menu for obtaining help.

FIG. 24 are example wire frames of the application menu for a contact form.

FIG. 29 is an example wire frame of the web portal for consulting all loans.

FIG. 30 is an example wire frame of the web portal for selecting a loan.

FIG. 31 is an example wire frame of the web portal for consulting a selected loan.

FIG. 33 is an example wire frame of the web portal for paying a selected loan.

FIG. 35 is an example wire frame of the web portal for a help menu.

FIG. 36 is an example wire frame of the web portal for the help menu.

FIG. 38 is an example wire frame of the web portal for the history menu.

DETAILED DESCRIPTION

Figure 1:
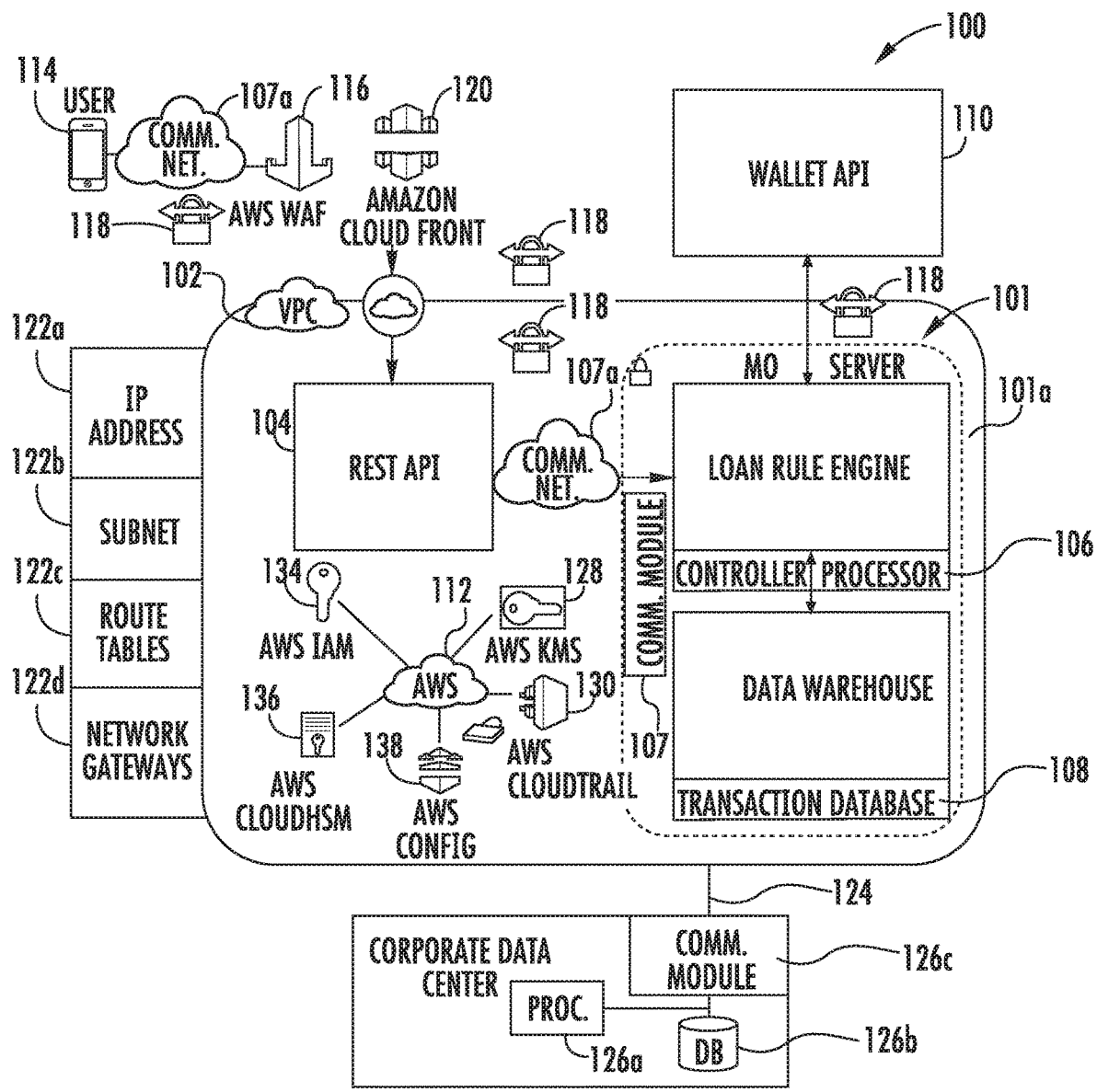
FIG. 1 is a fragmentary, block diagram showing components of the loan issuance system in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The loan issuance system that is described in detail below includes a credit approval and loan issuance system or platform operating via a loan issuance server that allows nano and micro credit and pre-scoring anonymously for use at a user's mobile wireless communications device or at a user's web portal or related software platform. It is a new credit evaluation system that overcomes those disadvantages of existing systems that require personal and often confidential information such as names, surnames, social security numbers, credit and/or debit card information, and even a credit history of the user. Using the current loan issuance system, a person can be rated whose credit worthiness is difficult to understand, such as young people, renters and persons with smaller incomes. The pre-scoring may be accomplished anonymously based on user transaction data at a platform such as an e-wallet or other transactional platform, e.g., Uber, Facebook, eBay, or similar platforms. The data may be based on the user location, gender, age range, cellular operator and cellular phone model as non-limiting examples.

A loan rule engine as part of the system server and any associated processor includes a credit decision engine algorithm operative as a loan rule engine as part of the system architecture and may use machine learning data behavior analysis and predictive mathematical models. The credit scoring algorithm as part of the loan rule engine is dynamic and adjusts scoring continuously based on data correlation in order to optimize the value of the maximum loan issuance and the maximum number of loans that are issued to a user, for example, as a factor of a minimum bad debt value. The system architecture ensures security and speed in system response and scalability by hosting, for example, Amazon Web Services (AWS) and PCI compliant components, but also ensuring enhanced computer and system operation. Data may be managed to allow pre-scoring in order to optimize a user's experience and return loan and credit decisions in a few seconds, e.g., a maximum of 20 seconds. This time period could include any transmission delay in many examples. This anonymous analysis approach used by the loan issuance system removes any requirement for the user to input information and results in a more simple and efficient framework using, for example, UNIX based systems having different design patterns, such as a Model-View-Controller (MVC). It is platform independent and supports different client agents for an enhanced customer experience.

The loan issuance system as described is also referred to in this description as the MO system and sometimes explained by the designation "MO$" in the drawings and is a complete system architecture and platform that includes a MO server and processors operative as a loan rule engine and operative with databases that are integrated with the MO server or separate databases and operative as a data warehouse. Other system components may include an e-wallet associated with the user, an application API and application database. The loan rule engine operates as a credit decision engine. The MO system is innovative and does not use any of the traditional data and credit records that may be private and confidential to the user. The MO system pre-scores users anonymously. It is typically not necessary to incorporate personal information such as the name, surname, social security number, or credit/debit card information of a user in order to make a credit or loan decision. The MO system analyzes transactional data from an e-wallet or other hosting application and combines this information with data from external data sources to assign a maximum credit. This is usually a smaller amount such as useful with nano and micro-loans. The MO system as a credit and loan system is integrated with the e-wallet such as incorporated with mobile device applications or a hosting application in a web portal. The MO system is user friendly and intuitive, using in one example a maximum of three clicks or entries on a mobile device or other device to obtain a loan and disbursement. The user does not need to provide any additional detailed information. The credit decision is based on transactional data and the data from external sources that the MO system automatically collects. An advantage of the system is that in many cases, the user is already pre-approved. Once requested, the loan is credited to the e-wallet or hosting application in less than one minute.

As explained in further detail below, the MO system supports three credit types as proactive, reactive and corporate, and supports three disbursement types as unrestricted, restricted and direct bill payment. The MO system may include a Customer Communication Manager (CCM) as part of the MO server to manage the messaging to different users. It is available 24/7 so that a user can request a loan anytime and anywhere. The MO system would not store a user ID or personal information because data is processed via an anonymous identification code.

The system is operative to determine the creditworthiness and issue loans to consumers and generate a behavioral profile of the consumers. A mobile wireless communications device of a consumer is connected via a wireless communications network to a loan issuance server having a communications module, controller and transaction database connected thereto. The method includes acquiring at the loan issuance server an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The method includes randomly generating at the loan issuance server a user ID number that matches the initial set of data that had been acquired about the consumer and storing the initial set of data and user ID number corresponding to the consumer in the transaction database as a user profile. The method further includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and a loan approval code is transmitted from the loan issuance server to the wireless communications device of the consumer to initiate an application programming interface (API) on the mobile wireless communications device of the consumer to confirm or enter a value of a loan to be made. The method includes receiving back from the consumer the confirmation or value of the loan to be made and an indication of how it is to be dispersed and in response, crediting the e-wallet of the consumer or paying a bill associated with an account of the consumer in the value of the loan. A behavioral profile for the consumer is generated based on the consumer location and check-ins to at least one of the e-wallet and the loan issuance server and further correlating periodic location patterns to loan and transactional activities.

The method may further include generating the behavioral profile using a customer conversation modeling or a multi-threaded analysis or any combination thereof. The method may further include generating the behavioral profile based on consumer segmentation with consumer information provided via the contents of each transaction and using affinity and purchase path analysis to identify products that sell in conjunction with each other depending on promotional and seasonal basis and linking between purchases over time.

The consumer check-ins and location for a consumer may be matched against a known-locations database that includes data regarding stores, private locations, public places and transaction data and correlating periodic location patterns to loan and transactional activities. The method may include predicting by consumer profile and periodicity, loan disbursement patterns, use of loans, loan repayments, and transaction activities. The method may include connecting the mobile wireless communications device of the consumer to the wireless communications network and the loan issuance server via the e-wallet and storing information in the transaction database about consumers that subscribe to an e-wallet and their transactions and displaying an application programming interface (API) on the mobile wireless communications device. The consumer interacts with the e-wallet via the API on the mobile wireless communications device.

The non-identification attributes may include the gender, age, location, phone type, and cellular operator. The method may include transmitting the maximum credit via the API to the e-wallet that is tagged with the randomly generated user ID number, matching the user ID number to the actual consumer, and adding new attributes to the consumer and crediting a loan to the e-wallet for the consumer. In response to receiving the loan approval code, the consumer accesses at least one API screen on the mobile wireless communications device and enters data indicative of the value of the loan to be made and transmits that data to the loan issuance server to obtain the loan.

A method of determining the creditworthiness and issuing loans to consumers includes connecting a mobile wireless communications device of a consumer via a wireless communications network to a loan issuance server having a communications module, controller and transaction database connected thereto. The method includes acquiring at the loan issuance server an initial set of data from at least one of an electronic wallet (e-wallet) of the consumer and public data sources containing data about the consumer, wherein the initial set of data includes non-identification attributes of the consumer without obtaining a full name, a credit card number, a passport number, or a government issued ID number that allows identification of the consumer. The method further includes randomly generating at the loan issuance server a user ID number that matches the initial set of data that had been acquired about the consumer and storing the initial set of data and user ID number corresponding to the consumer in the transaction database as a user profile. The method includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and transmitting a loan approval code from the loan issuance server to the wireless communications device of the consumer to initiate an application programming interface (API) on the mobile wireless communications device of the consumer to confirm or enter a value of a loan to be made and receiving back from the consumer the confirmation or value of the loan to be made and an indication of how it is to be dispersed. In response, the e-wallet of the consumer is credited or a bill associated with an account of the consumer is paid in the value of the loan.

A system of determining the creditworthiness and issuing loans to consumers may include a loan issuance server having a communications module, controller and transaction database connected thereto. A wireless communications network is connected to the loan issuance server. The controller and communications module are operative with each other to communicate with a consumer operating a wireless communications device via the wireless communications network and acquire an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The controller is further configured to randomly generate a user ID number that matches the initial set of data that had been acquired about the consumer and store the initial set of data and user ID number corresponding to the consumer in the transaction database as a user profile. The controller generates a credit score based on the average credit among a plurality of user profiles stored within the transaction database and matches a data attribute string based on the user ID number and the initial set of data to determine a maximum allowed credit for the consumer. The controller approves a loan based on the maximum allowed credit of the consumer and configures the communications module to transmit a loan approval code to the wireless communications device of the consumer to initiate an application programming interface (API) on the mobile wireless communications device of the consumer to confirm or enter a value of a loan to be made and receive back from the consumer the confirmation or value of the loan to be made and an indication of how it is to be dispersed. In response, the controller credits the e-wallet of the consumer or pays a bill associated with an account of the consumer in the value of the loan.

The controller is configured to generate a behavioral profile for the consumer based on the consumer location and check-ins to at least one of the e-wallet and the loan issuance server and further correlate periodic location patterns to loan and transactional activities. The controller is configured to generate the behavioral profile using a customer conversation modeling or a multi-threaded analysis or any combination thereof. The controller is configured to generate the behavioral profile based on consumer segmentation with consumer information provided via the contents of each transaction and using affinity and purchase path analysis to identify products that sell in conjunction with each other depending on promotional and seasonal basis and linking between purchases over time. The controller is configured to match the consumer check-ins to at least one of the e-wallet and the loan issuance server and the location for a consumer against a known-locations database that includes data regarding stores, private locations, public places and transaction data and correlating periodic location patterns to loan and transactional activities. The non-identification attributes comprises the gender, age, location, phone type, and cellular operator.

FIG. 1 is a high-level block diagram of an example credit decision and loan issuance system showing basic components of the entire networked system indicated generally at 100 and includes the MO System 101 that includes a MO server 101a also corresponding to the loan issuance server and may have components associated with a Virtual Private Cloud (VPC) 102, including a REST API 104 and provides interoperability between computer systems on the internet allowing systems to access and manipulate textual information. The MO server 101 includes a processor as a controller 106 with other circuit components, including software and/or firmware operative as a Local Rule Engine and an integrated or separate transactional database that may be a sub-component or include a Data Warehouse 108 that could be incorporated with or separate from the MO server 101a. A communications module 107 is operative with the controller 106 and communications with a communications network 107a, such as a wireless network. However, the module 107 could operate as a landline based, WiFi, or other communications protocol. The controller and Local Rule Engine 106 interfaces with a wallet API corresponding to an e-wallet application 110. The Amazon Web Services (AWS) 112 is described in a non-limiting example as integrated with the MO system 101, but other types of network systems could be implemented and used besides the AWS. The user as a consumer for the loan may operate their mobile device 114 and its application with an interface to the Amazon Web Services Web Application Firewall (AWS WAF) 116 to protect web applications from common web exploits and provide security as shown by the secure lock logo 118, which includes appropriate code and/or hardware components to protect against compromising security breaches and other occurrences or data breaches that consume excessive resources. The MO system 101 may control which data traffic to allow, may block web applications, and may define customizable web security rules. Custom rules for different time frames and applications may be created. The system operator of the MO system 101 will use an API such as associated with the MO server to automate any creation and deployment of improvements, system operation, and maintenance web security rules.

The AWS WAF 116 is integrated with an Amazon CloudFront 120, which typically includes an application load balancer (ALB). The CloudFront 120 operates as a web service to permit effective distribution of data with low latency and high data transfer speeds. Other types of web service systems may be used. The Amazon CloudFront 120 interoperates with the Virtual Private Cloud (VPC) 102 and provisions logically isolated sections of the CloudFront 120 in order to launch various resources in a virtual network that the MO system 101 defines. This allows control over the virtual networking environment, including IP address ranges 122a, subnets 122b and configurations for route tables 122c and network gateways 122d. A hardware VPN connection 124 could exist between a corporate data center 126 and the MO system's Virtual Private Cloud 102 and leverage the AWS CloudFront as an extension of a corporate data center. The corporate data center 126 includes appropriate servers or processors 126a, databases 126b, and communications modules 126c that communicate with the MO server corresponding to the MO system 101, which in a non-limiting example, could incorporate the corporate data center.

As part of the Virtual Private Cloud 102 is the Representational State Transfer (REST) Application Programming Interface (API) 104 that provides interoperability among computer systems on the internet and permits different data requesting systems to access and manipulate representations of web resources using a uniform and predefined set of stateless operations. The Amazon Web Services 112 interoperates with the AWS Key Management Service (KMS) 128 and manages encryption and provides key storage, management and auditing to encrypt data across the AWS services. The AWS CloudTrail 130 records API calls made on the account and delivers log files, for example, to an "S3" bucket or database as a cloud storage in one example with one or more databases such as could be part of the data warehouse 108 operative as the transaction database and provides visibility of the user activity since it records the API calls made on the account of the MO system 101. The CloudTrail 130 may record information about each API call, including the name of the API, the identity of the caller, the time and different parameters that may be requested or response elements returned by the service in order to track changes made to AWS resources and determine greater security and identity of users.

The AWS Identity and Access Management (IAM) 134 will permit the MO system 101 to control individual and group access in a secure manner and create and manage user identities and grant permissions for those users to access the different resources. The AWS Cloud HSM service 136 permits compliance with different requirements, including data security using a hardware security module appliance within the cloud. It may help manage cryptographic keys. The AWS CONFIG module 138 permits compliance auditing, security analysis, change management, and operational troubleshooting. The different resources may be inventoried with changes in configurations and reviewed relationships. The REST API 104 interoperates with the Loan Rule Engine as part of the controller 106 and Data Warehouse 108 of the MO system 101.

Figure 2:
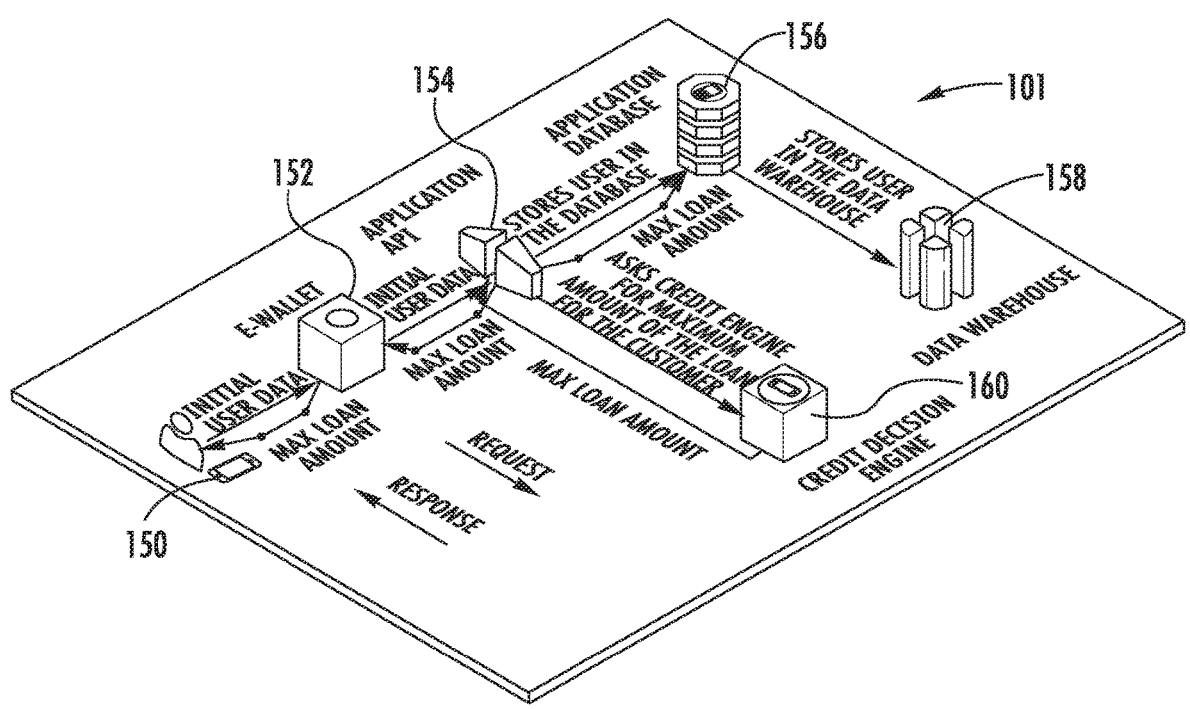
FIG. 2 is a fragmentary block flow diagram showing data flow for a pre-scoring process.
Figure 3:
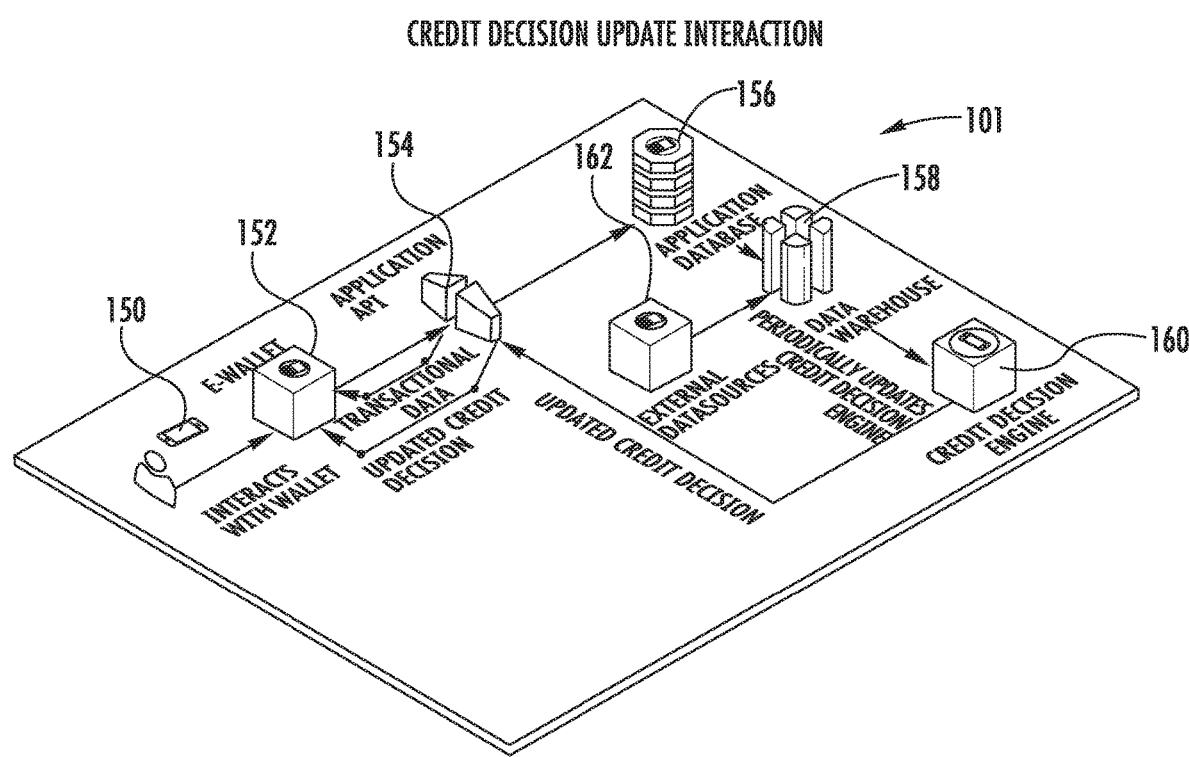
FIG. 3 is a fragmentary block flow diagram showing data flow among system components for a credit decision update.

The MO system 101 operates in one non-limiting example in a two-phase approach. FIGS. 2 and 3 show components used with a respective pre-scoring process (FIG. 2) and credit decision update interaction (FIG. 3). Basic components are described with new reference numerals and shown in FIG. 2 as the user device 150 interoperating with the e-wallet 152 and application API 154 as part of the application to interface with the MO system 101 and obtain a loan, and an application database 156, which interoperates with the data warehouse 158. The application API 154 interoperates with a credit decision engine 160 that may correspond to the loan rule engine 106 as shown in FIG. 1. Many of the modules/components could be incorporated within the same MO server or separate. The data warehouse 158 may correspond to the data warehouse 108 in FIG. 1. The application database 156 could be separate or integrated with the date warehouse and could include relational and non-relational components. Initial data from a consumer could be stored initially in the application database 156, and could even be a more dynamic and shorter term memory than the data warehouse. Other units in FIG. 1 may correspond respectively to various components such as the e-wallet 110 of FIG. 1 to the e-wallet 152 in FIG. 2 and the application database 156 may corresponds to a portion of the data warehouse 158 or be a separate database as part of the Virtual Private Cloud 102, but in some cases, still component parts of the MO system 101 and MO server.

Figure 4:
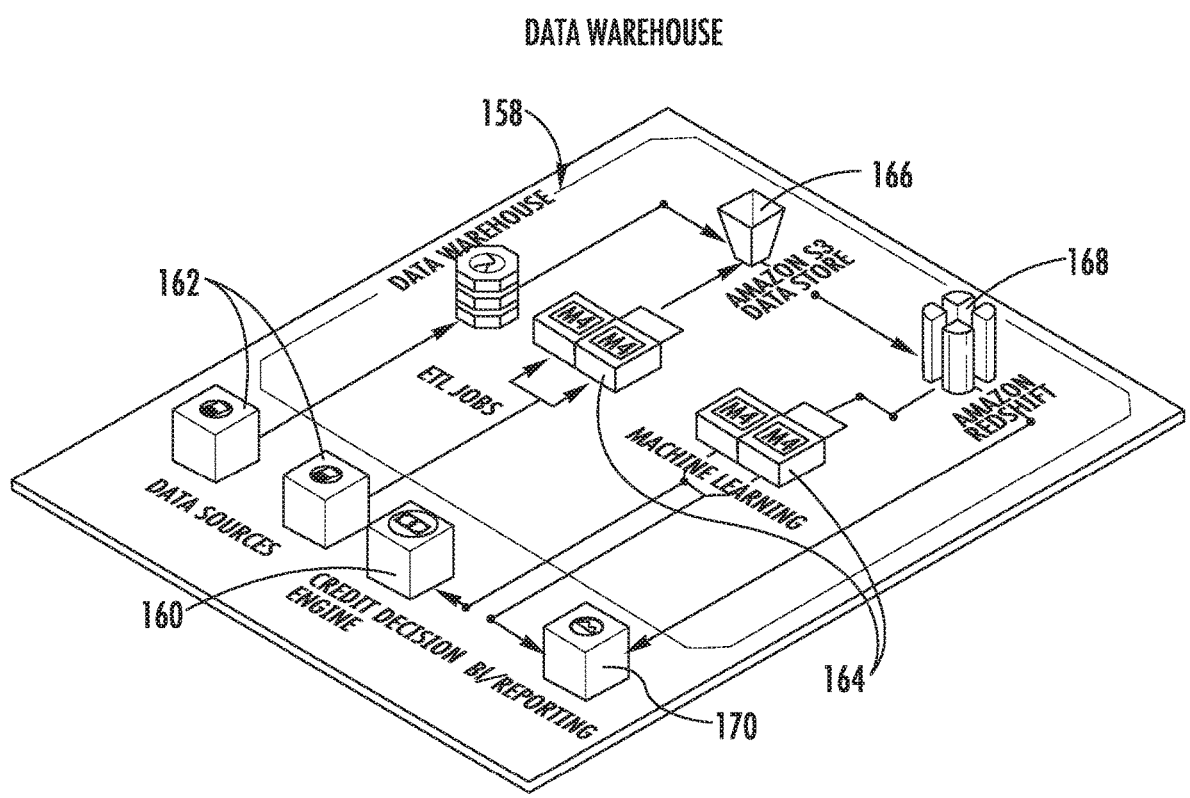
FIG. 4 is a fragmentary block flow diagram showing data flow among components in the data warehouse.

Referring now to FIG. 3, there is shown a similar view of the credit decision update interaction, but also showing the external data sources 162. Referring now to FIG. 4, the data warehouse 158 receives data from data sources 162 that interoperate with ETL (extract, transform, load) jobs and machine learning components 164 that in turn interoperate with a data store such as the Amazon simple cloud storage service (S3) 166, and in a non-limiting example, Amazon Redshift as an internet data warehouse service 168. These components via machine learning interoperate with the business intelligence reporting module 170. In this process, it is possible to analyze data using a SQL (Structural Query Language) and existing business intelligent tools to create tables and columns with the most accurate data types and detect schema changes and keep the tables up-to-date. Many dozens of data inputs can be connected and mash ups may be created to analyze transactional and user data. It is possible to use both relational and non-relational databases depending on the types of data.

In the first phase generally shown by the flow sequence in FIG. 2, when a user 150 initially signs-in to the e-wallet 152 or other transactional application platform connected to the MO system 101, the system via the processing of the engine 160 generates a first pre-approved maximum credit typically based on the initial set of data, and without acquiring any identification data for the users. This first anonymous credit decision may typically be made within 20 seconds from the user data being passed to the system.

In the second phase generally shown by the flow sequence in FIG. 3, after the user data is initially stored in the data warehouse 158 and is assigned an initial maximum credit, the MO system 101 starts acquiring transactional and external data to update the maximum credit periodically. The end user cannot never request a loan, but can only request a release of loan funds up to the maximum credit pre-approved and set by the MO system 101.

Phase 1: Initial User Profile Generation and Maximum Credit

The system credit scoring engine 160, which may be part of the controller 106 (FIG. 1) and data warehouse 158 acquire an initial set of user data via the application API 154 with the source e-wallet 152 or transactional application.

As illustrated in the flow sequence of FIG. 2, the user 150 communicates with the e-wallet 152 and communicates initial user data with the application API 154, such as implemented by the MO system 101 and could be the application brought up on the mobile device or accessed via a web portal. This data is stored in the application database 156 and in the data warehouse 158. Based on the initial user data, the user makes a request for credit and the application API 154 queries the credit (or loan) engine 160 for the maximum amount of the loan that may be made to the customer (user) and returns that data on the maximum loan amount. Based on this initial request, the response for the maximum loan amount is returned to the user mobile device 150, or as an example, web portal depending on how the user contacts the MO system. This maximum loan amount information is also transferred from the application API 154 to the application database 156 and stored in the data warehouse 158.

This initial set of data may be retrieved from the initial communications with the user data from external databases based on the external data sources and may include the gender, age, location, phone type, cellular operator, and a randomly generated user ID that uniquely matches this data set to a physical user in the e-wallet 152 and in the transactional application database 156. The MO system 101 does not acquire any information that allows identification of the user 150, such as full name, address, credit card number, passport number, or a government issued ID number.

An example of the initial data structure generated for each user is: user ID; Attribute 1; Attribute 2; Attribute 3; Attribute 4; ... ; Attribute N. The system uses this initial attribute string to generate an immediate credit score for this user, by matching this user attribute string to the user's database and applying the maximum credit score for the user profile, calculated as the average credit among all user profiles matching the initial set of attributes.

Initial user ID: N attributes a) Users Database Match:

Filter by users that match the same N attributes values: X user profile with N+Y to Z attributes;

b) Maximum Credit Calculation:

Average value of Maximum Credit for user profiles with N+Y to Z attributes;

Correlation and probability of repay loan prediction for user profiles with N+Y to Z attributes; and Apply business rules.

The maximum credit calculated for that user is then sent via the MO system API 154 to the e-wallet 152 and then the transactional or application API 154 is tagged with the randomly generated User ID number. The e-wallet 152 and "transactional" API application 154 then matches the user ID to the actual physical user operating with the MO system 101 and to this user the maximum credit value is a Pre-Approved Credit.

The above process, from initial acquisition of user data, to communication of the maximum credit for the user, may take approximately 20 seconds in typical cases.

Phase 2: User Profile Data Expansion

Once the new user is recorded in the Data Warehouse 158, and the initial Maximum Credit score generated, the MO system 101 initiates the process of adding and computing new attributes to the user profile using the loan activities and acquiring all transactional data from the e-wallet 152 and transactional application API 154. In this example, the user transactional data may be imported from the e-wallet 152 and transactional application API 154 once every X hours.

The MO system 101 will also match relevant external attributes to the user profile. The MO system 101 may generate a database of external data that are imported from a variety of public domain sources as the external data sources 162 in an example. This external data is continuously updated and correlated to the users linking to their initial generic attributes, e.g., location linked attributes; gender linked attributes; age linked attributes; cellular operator linked attributes; and cell phone type linked attributes.

The new data attributes are stored in the data warehouse 158 and associated to the unique user ID as a user ID and attributes as N (initial)+X (transactional)+Y (external)+Z (loan/repayments).

Loan Activities

These activities include loan transactions (loan taken, use of loan, amount, date and time) and repayment activities (repayments, amount, date and time).

Transactional Data

The transactional data may include all data from the transactional activities on the e-wallet 152 and application platform such as occurs at the MO system 101 on its MO server, for example, which profile the digital behavior of the users, such as:

Cash-in transactions (amounts, type of cash-in, location of cash-in, date and time);

Cash-out transactions (amounts, type of cash-out, location of cash-out, date and time);

Bill payment transactions (type of bill, status of bill [expired, early payment, on-time], amounts, date and time);

Purchase transactions (amounts, type of purchase, location of purchase, date and time);

Cellular phone top ups (amounts, location of top-ups, date and time);

Log-in activities (log-in date and time, duration of session, session flow, time spent on each screen);

Sales transactions (sales value, type of product sold, location of sale, date and time);

Commission transactions (commission value, type of commission, date and time);

The money transfer transactions (sent/received, sent by/received by, value, location, date and time); and Any other transactional or activity recorded in the e-wallet/platform.

External Data

The external data may be received from the external data sources 162 such as shown in FIGS. 3 and 4 and include data collected from public domain sources, paid for data sources, and historical data archives of the mobile operators, such as:

Criminal records by geo-location;

The value of any homes by geo-location;

The value of any rental homes by geo-location;

Average income by geo-location, gender and age groups;

Education data by geo-location and gender;

Public transport options by geo-location;

Social media activities by geo-location, gender and age groups;

Infrastructure and services available by geo-location (hospitals, dentists, clinics, supermarkets, hardware stores, furniture stores, shopping malls, etc.); and Mobile usage data (age of account, number of outgoing calls, number of incoming calls, number of mobile numbers called, average monthly spending, number of monthly top ups, etc.).

Figure 5:
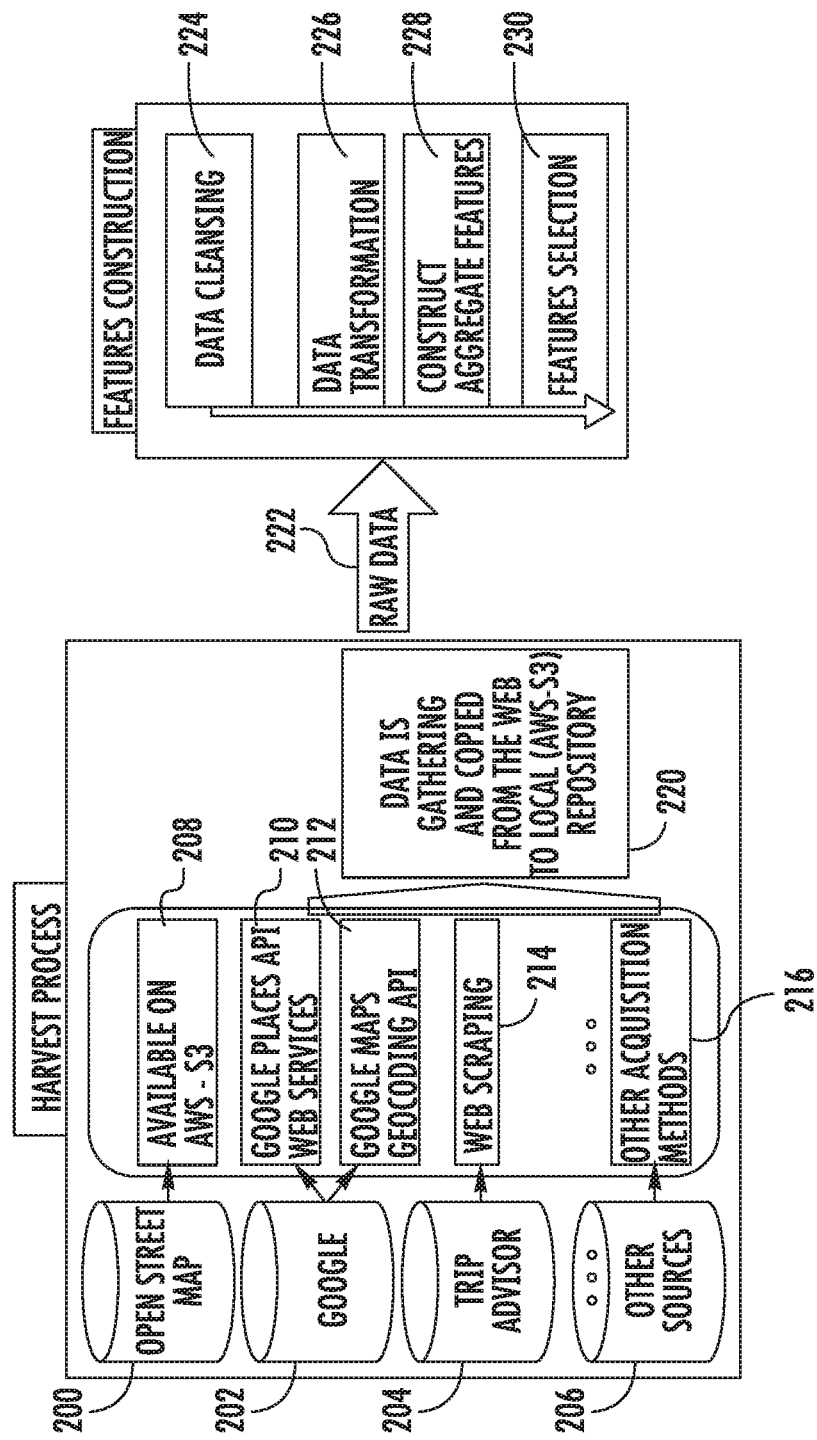
FIG. 5 is a block diagram of acquiring external data using the system of FIG. 1.

Referring now to FIG. 5, there are shown further details of the process to collect external variables used to determine the creditworthiness and risk of a user as a potential customer. The external variables are considered as all public information and may be collected through geo-location information such as public and private infrastructure, weather, ratings, and public evaluations of surrounding establishments. Common data sources include web mapping services such as Google Maps and Open Street Maps, web services, web pages, and public data repositories. The various data sources as non-limiting examples are illustrated such as an Open Street Map 200, Google 202, Trip Advisor 204, and other sources 206.

For example, the Open Street Map application may be available via the Amazon web services cloud storage 208 (S3) and the Google Places API and Web Services 210 may interoperate with Google, including Google Maps and a Geocoding API 212. Web scraping 214 may be used together with other acquisition methods 216. There are many other possible data acquisition methods to be taken advantage of. Data is gathered and copied from the web to a local repository 220 and raw data 222 is then cleansed 224, transformed 226, aggregate features constructed 228, and final features selected 230. It should be understood that the harvest process is determined by the data source types and some sources could be available for direct download as tables. Other sources may require additional methods to access data. For example, Google Maps data and information may be obtained by querying and request data available on various Google application programming interfaces. The web scraping techniques are a useful tool for accessing information contained in documents such as web pages. A data parser program could be used to parse and capture relevant information. Once raw data is gathered and copied from a source to the local repository, the system performs a pre-processing stage where data is cleaned and transformed in order to construct and select new features that may be used for predictive models.

Using the features selection 230, the MO processor as part of a MO server, i.e., MO system 101, and rule engine 106 may infer which variables contribute more to explain some customer characteristics such as socio-economic status, purchasing power, economic dynamics, and land-use. Different methods may establish the relation between external variables and the target characteristics.

Different processing methods and algorithms as non-limiting learning methods may be used. For example, the correlation coefficient may be used to infer the association between each external variable and the target. Variables at the highest correlation are considered as better target descriptors. For example, a rank correlation could study the relationships between rankings of different variables or different rankings of the same variable while the measure of the strength and direction of a linear relationship between two variables may be defined as a (sample) covariance of the variables divided by the product of their (sample) standard deviations.

An information gain method may be used where the method calculates the relevance of the attributes based on information gain and assigns weights to them accordingly. The higher the weight of an attribute, the more relevant it is considered. Although information gain is usually a good measure for deciding the relevance of an attribute, it may have some drawbacks and a notable problem occurs when information gain is applied to attributes that can take on a large number of distinct values. This issue may be tackled with a gain ratio. In any decision tree learning, the information gain ratio is a ratio of information gain to intrinsic information and may reduce a bias towards multi-valued attributes by taking the number and size of branches into account when choosing an attribute. A random force with gain ratio methodology trains random force with gain ratio as an attribute selector. Information may be considered as a gain ratio for generating attribute weights. This decision methodology is also known as random decision force and operates in one example by constructing a multitude of decision trees at training time and outputting the class that is the mode of the classes as classification or mean prediction as a regression of the individual trees.

It is also possible to use a weight by Gini index that calculates the relevance of the attributes of the given external variables set based on the Gini impurity index. The weight by Gini index operator calculates the weight of attributes with respect to the target attribute by computing the Gini index of the class distribution. The higher the weight of an attribute, the more relevant it is considered. This operates as a measure of statistical dispersion in the Gini coefficient making equality among values of a frequency distribution.

It is possible to use a weight by Support Vector Machine (SVM) that computes the relevance of the external variables by computing for each variable of the input set the weight with respect to the target. This weight represents the coefficients of a hyper plain calculated by the SVM. They operate as a supervised learning model that analyzes data used for classification and regression analysis.

Figure 6:
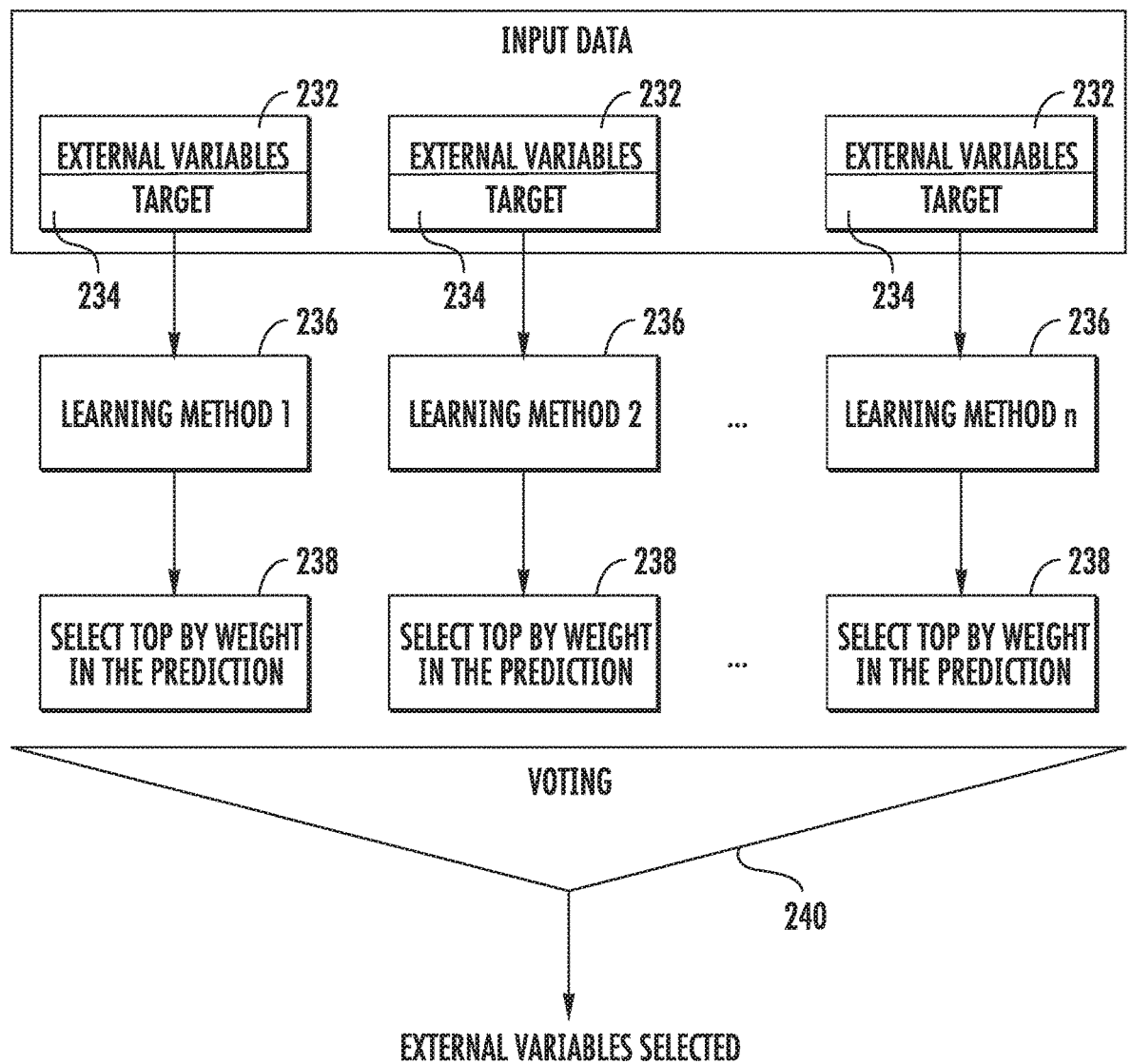
FIG. 6 is a flowchart showing attribute selection using the system of FIG. 1.

Referring now to FIG. 6, there is illustrated a non-limiting assembly strategy to select the features with voting used to select between the top attributes employed by each method to compute the prediction that previously was carried out separately. The input data has external variables 232 and a target 234 with the learning methods 236 that select the top by weight in the prediction 238 with the voting 240 to establish the selected external variables.

Figure 7:
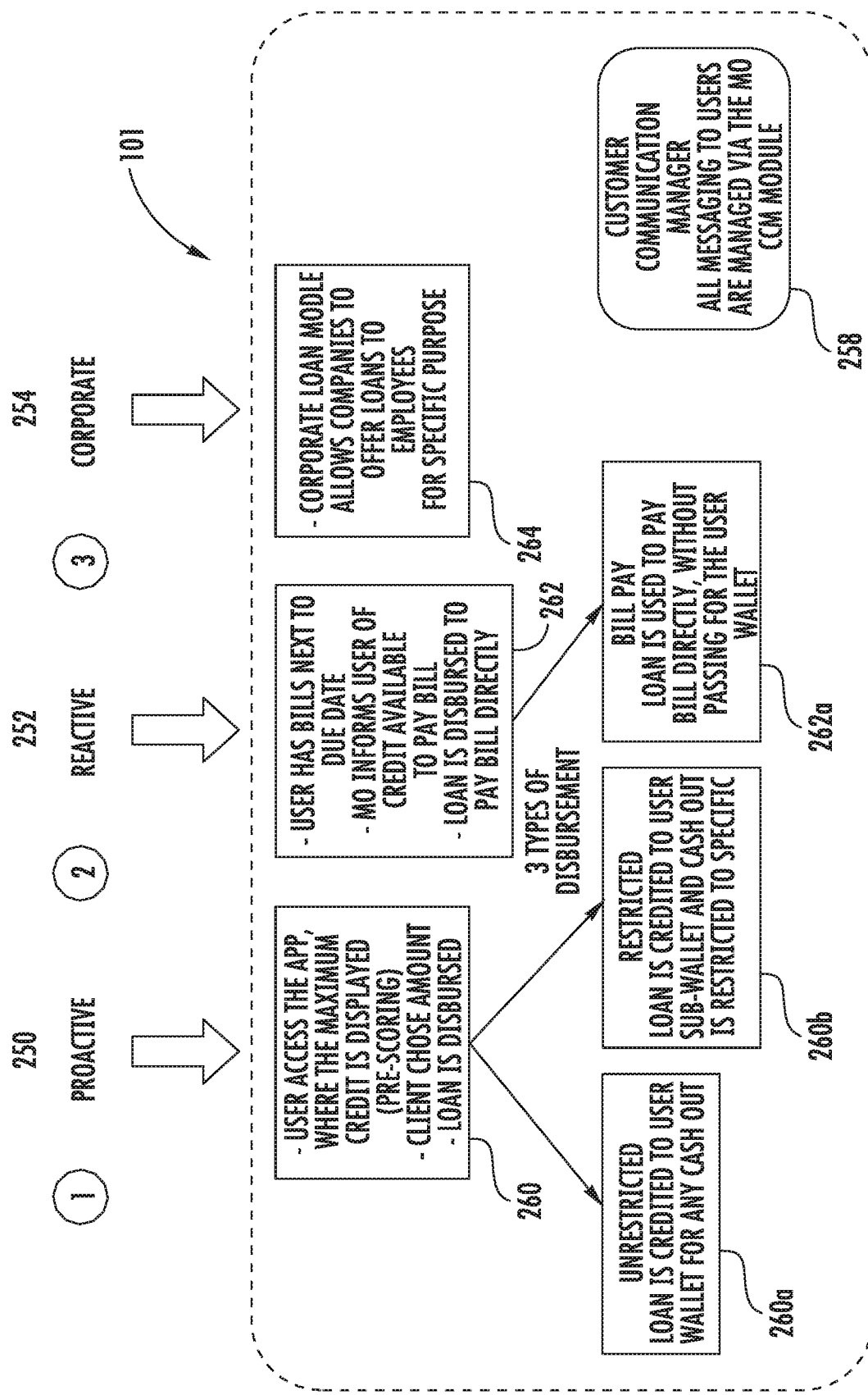
FIG. 7 is a block diagram showing the types of loans and disbursements using the system of FIG. 1.

Referring now to FIG. 7, there are shown examples of the loan and disbursement types to maximize product offerings supported by the MO system. Proactive 250, reactive 252 and corporate 254 loans are supported and unrestricted 260a, restricted 260b, and bill pay disbursements 262a are supported. As illustrated, a customer communication manager 258 functions with the user through their mobile application typically and all messaging to users are managed via the MO system 101 via customer communications manager module 258. This module 258 manages all messaging. The customer communication manager module 258 will manage the recipient's user accounts, including passwords and access modifications. As shown with the proactive system 250, the user accesses the application with the maximum credit displayed with pre-scoring and the client chooses the amount and the loan is disbursed (Block 260) and is either unrestricted where the loan is credited to the user for any cash out (Block 260a) or restricted with the loan is credited to the user sub-wallet and cash out is restricted to specific uses (Block 260b). In a reactive type system 252, the user has bills next to a due date and the MO system 101 informs the user of the credit available to pay the bill. The loan may be disbursed to pay the bill directly (Block 262) without passing for the e-wallet (Block 262a). The third type of disbursement as a bill pay occurs and the loan is used to pay the bill directly without passing through (or for) the user wallet (Block 262). In a corporate loan 254, the corporate loan module may allow companies to offer loans to employees for specific purposes.

Figure 9:
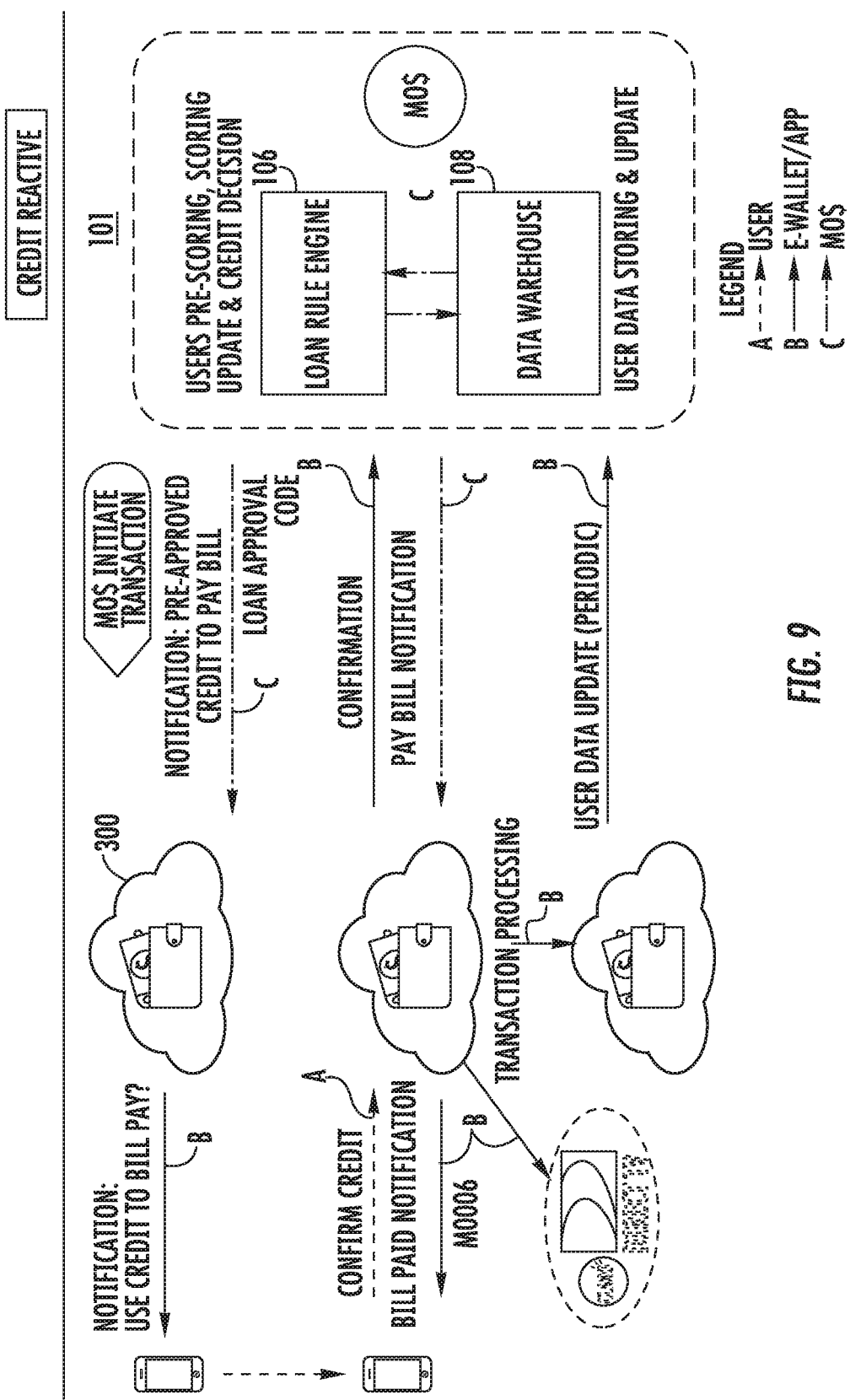
FIG. 9 is a flow sequence of paying a bill and receiving notification.
Figure 10:
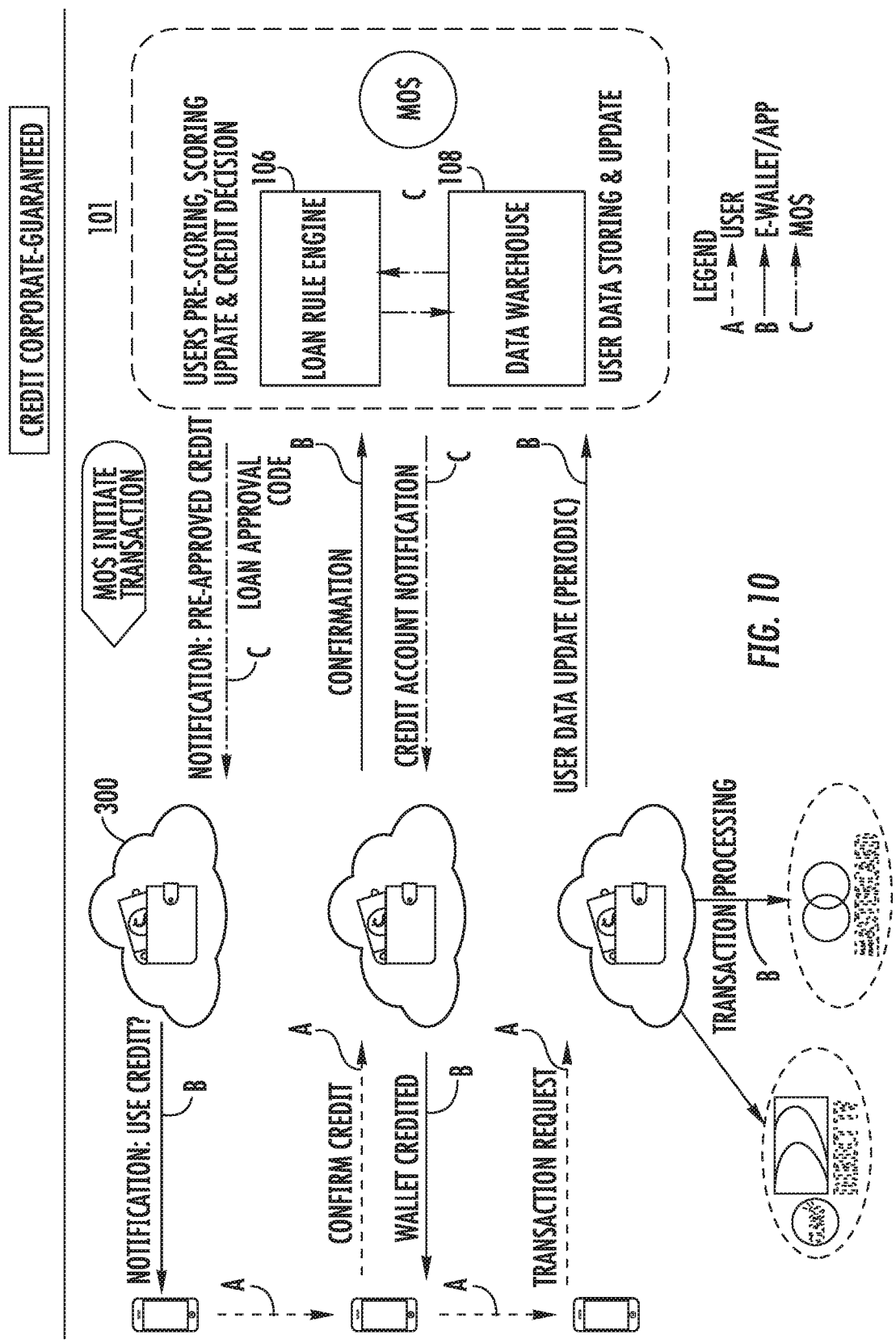
FIG. 10 is a flow sequence of guaranteed credit.
Figure 11:
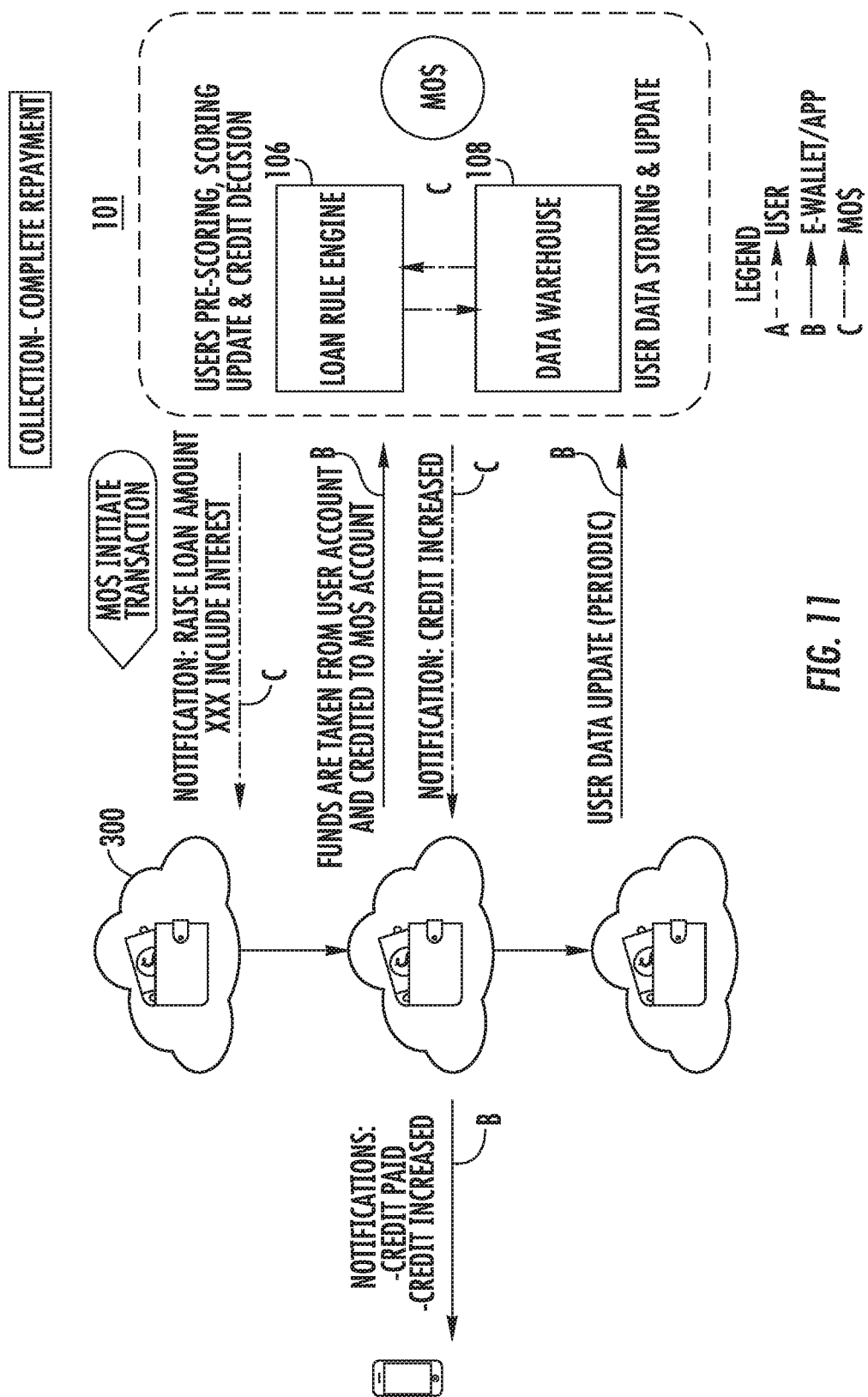
FIG. 11 is a flow sequence of a complete repayment.
Figure 12:
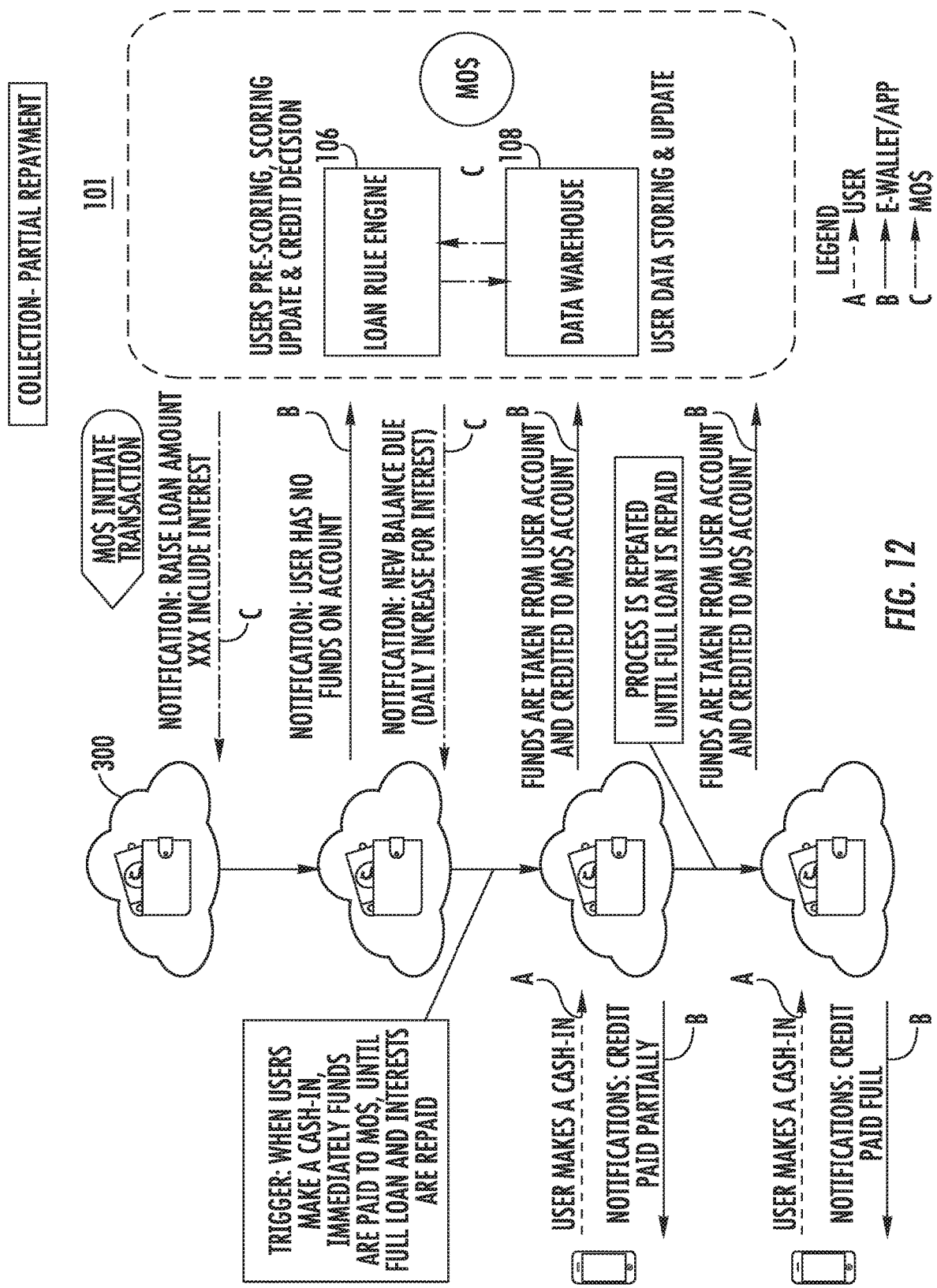
FIG. 12 is a flow sequence of partial repayment.

Referring now to FIGS. 8-12, there are illustrated flow sequences for the various processes shown in FIG. 7 such as the proactive, reactive, and corporate credit that is guaranteed and showing in FIG. 11 a collection as a complete repayment or partial repayment (FIG. 12). Each of the figures shows the user device 150 and operating with the application shown by the cloud 300 and interoperating with the system that includes the loan rule engine 106 and data warehouse 108 with the errors corresponding to A as the user and the e-wallet application as B and the system rule engine as C.

Figure 8:
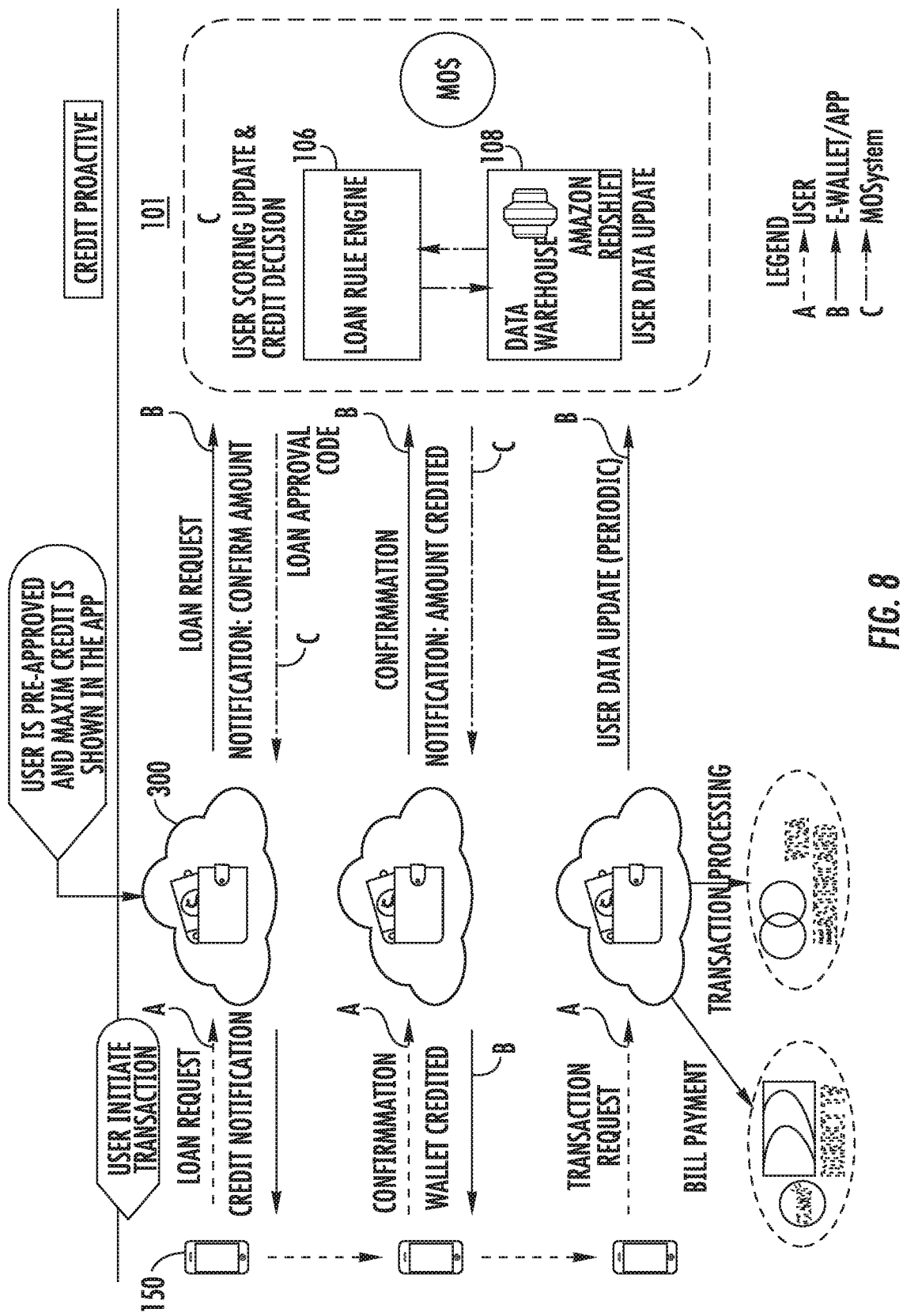
FIG. 8 is a flow sequence of confirming a loan request using the system of FIG. 1.

Referring now to FIG. 8, there is illustrated a flow sequence for a proactive credit with the various steps of a loan request and confirming the account in the credit notification followed by confirmation where the account is credited and notified and the e-wallet credited. The transaction request is made with the user data update that is periodic and the bill payment with the transaction processing. This accomplished with the user interaction with the loan rule engine 106 and data warehouse 108 of the MO system 100. In this process, the server 101 may generate and transmit to the mobile wireless communications device a loan approval code as part of the approval, which initiates the API on the consumer device to allow the consumer to confirm or enter a total amount to be loaned and even how it can be dispersed. Other variations may occur.

Referring now to FIG. 9, the flow sequence is shown for the reactive credit with the various steps and notifications and in FIG. 10, the flow sequence is shown for the corporate credit as a guaranteed amount.

Referring now to FIG. 11, there is illustrated a collection as in a complete repayment and in FIG. 12, the collection is shown as a partial repayment with the sequence of flow.

Referring again to FIG. 8, there are details shown of the proactive credit where the user at their device 150 initiates a transaction for a loan request and the user is pre-approved and a maximum credit is shown in the application API such as on the mobile device the user is using. The MO system 101 confirms the amount with a notification and the user confirms and the amount is credited and the wallet credited. Also with the transaction request, the user data is updated periodically and data stored in the data warehouse with the user data updated. Transaction processing may occur via a credit card processor such as the example MasterCard or VISA or a bill payment made such as to a cable company or Direct TV as in the illustrated non-limiting example. The loan approval code could be as simple as the notification to confirm the loan request so that the user API may confirm to allow the e-wallet to be credited.

Referring now to FIG. 9, the reactive credit process is shown where the MO system 101 initiates a transaction with a notification for pre-approved credit to pay a bill with a notification to the user's mobile phone in this example. The credit is confirmed and the paid bill notification made with the transaction processing in the user data update that occurs periodically.

In a corporate guaranteed credit shown in FIG. 10, the notification is made for the pre-approved credit that is confirmed and the credit account notification is made with the e-wallet credited and followed with the transaction request in the user data update that is periodic.

A complete repayment for collection is shown in FIG. 11 where a notification is made to raise the loan amount and that includes interest and the funds are taken from the user account and credited to the MO system 101. The notification is made that credit is increased and the notification then made to the device and the application that the credit is paid and credit increased. User data is updated periodically.

A partial repayment is shown for collections in FIG. 12 and a similar notification indicates that the loan amount is raised, but a notification is made from the application that the user has no funds on account and the notification is made that the new balance is due with the daily increase for interest. This triggers when the users make a cash-in and immediately funds are paid to the MO system until full loan and interest are repaid. The user then makes a cash-in via the application and funds are taken from the user account and credited to the MO account. The application makes a notification that the credit is paid partially and at this time, the process is repeated until the full loan is repaid. The user may make a cash-in and the funds are taken from the user account and credited to the MO system account and then the notifications are made that the credit is paid in full. That user data storing and update occurs. In all these examples, a loan approval code can be generated to initiate an API or other function and allow further entering of data such as a value of a loan or confirmation.

Figure 13:
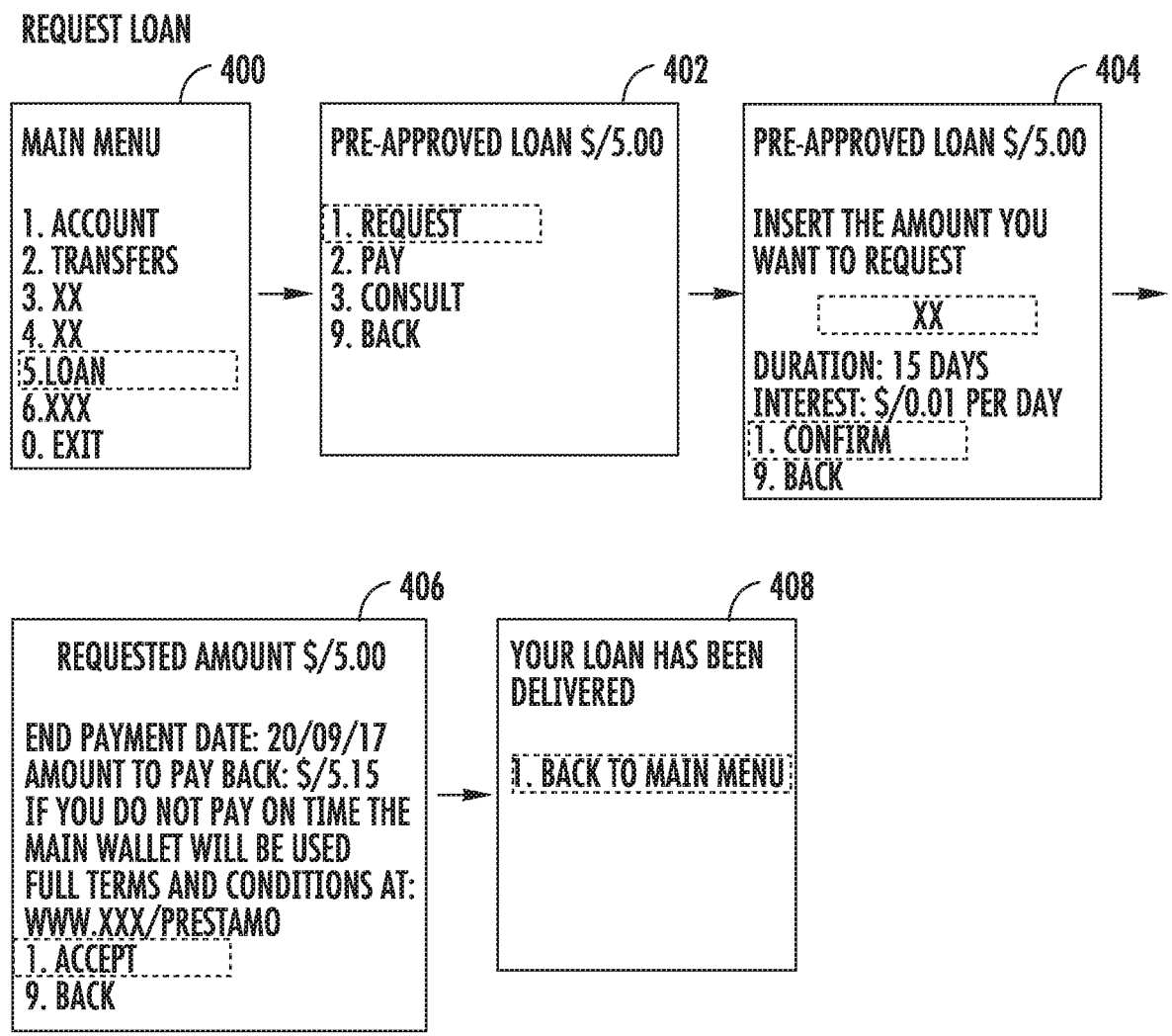
FIG. 13 are example wire frames of a USSD menu for requesting a loan.
Figure 14:
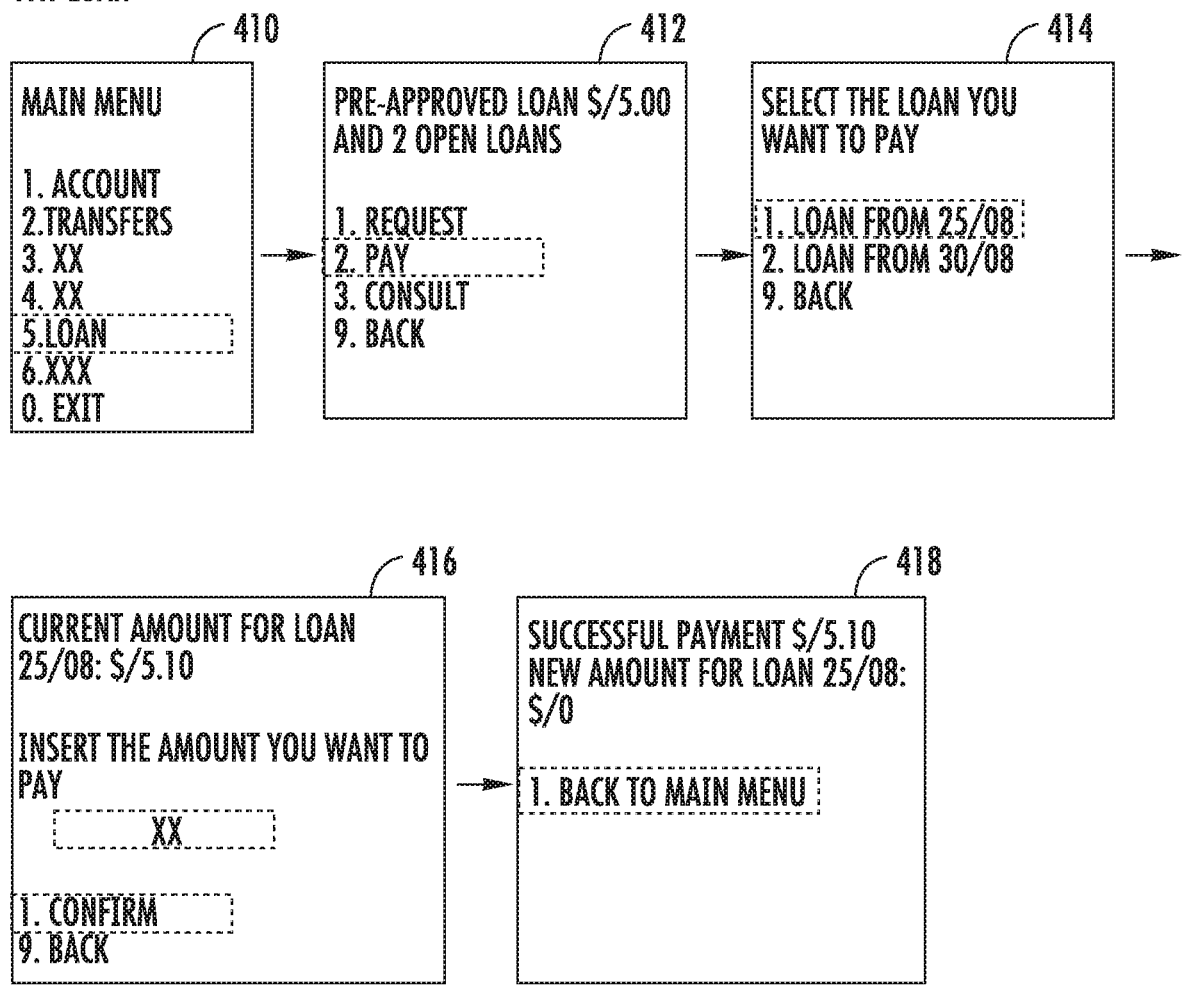
FIG. 14 are example wire frames of a USSD menu for paying a loan.

Referring now to FIGS. 13-15, there are shown wire frames as potential screen shots for the USSD menu that can be used on a mobile device, including a GSM phone. Messages sent over USSD are not defined by a standardization body and thus the MO system 101 and its network operator can implement the menu that is most suitable as illustrated.

As shown in FIG. 13, the wire frames indicate the user requesting a loan and showing the main menu and the selected loan (Block 400). The pre-approved loan is requested (Block 402) followed by the pre-approved loan with the amount that can be entered for the request (Block 404). The user may accept (Block 406) and the loan delivered (Block 408) with an indication for the main menu. The wire frames for paying a loan are shown at FIG. 14 with the loan amount shown in the main menu (Block 410) and the pre-approved loan for the payment (Block 412) followed by showing the loan selected to pay and its date (Block 414), the current amount of the loan (Block 416), and where information may be inserted and confirmed followed by successful payment (Block 418).

The wire frames for consulting a loan using the USSD menu as an example are shown in FIG. 15. The main menu is shown with the loan selected (Block 420) and the consulting for the pre-approved loan (Block 422). The menu is used for selecting the loan the user wants to consult with an open loan (Block 424). The user selects the loan to consult with the specific date (Block 426), followed by the current amount for the loan for that date and the particulars such as the end payment date (Block 428), and showing the selection for past payments with the past payments shown (Block 430).

Figure 16:
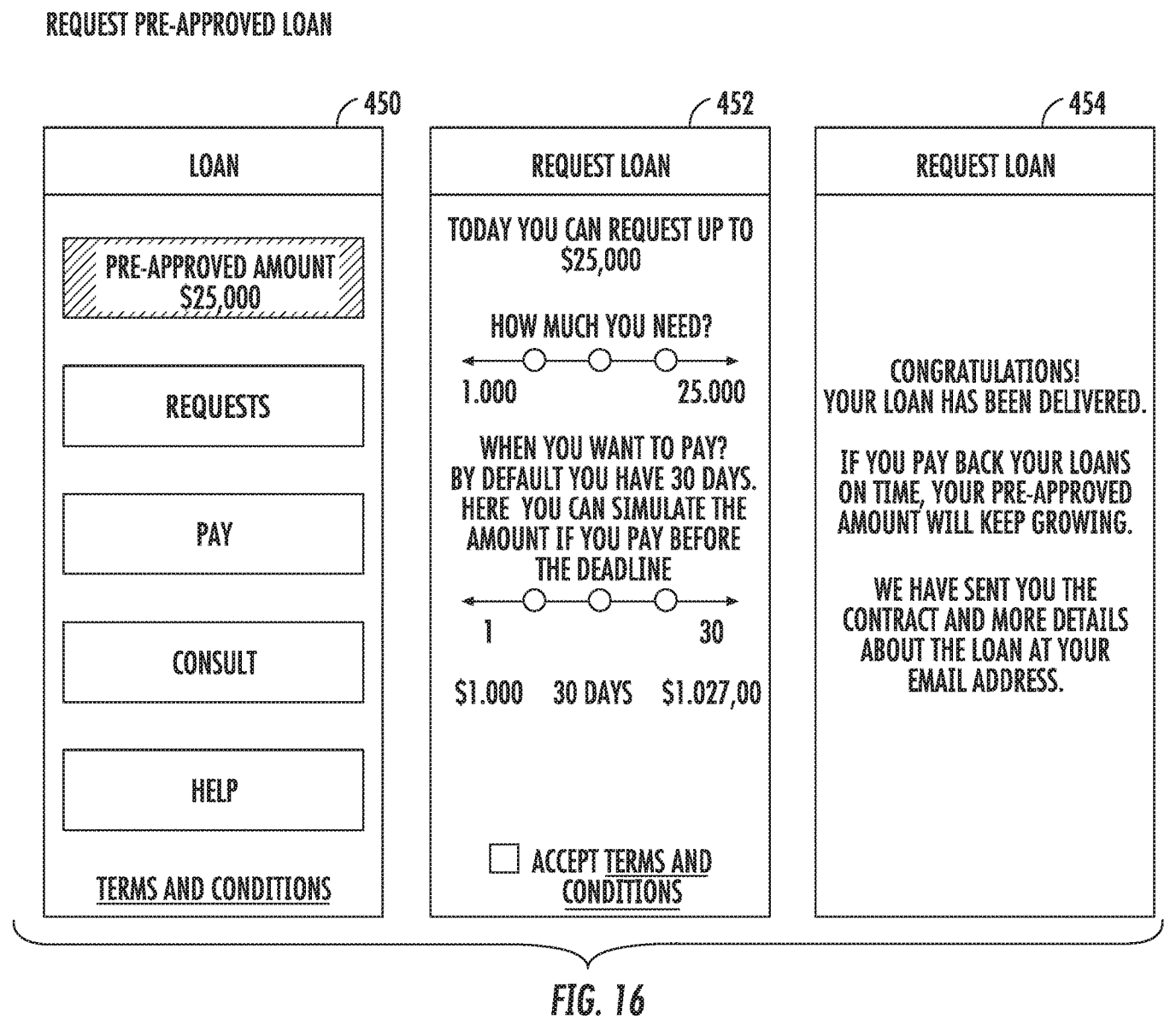

Referring now to FIGS. 16-25, there are illustrated the wire frames as potential screen shots for an application menu that can be used on many conventional mobile devices. It should be understood that what appears to be large dollar amounts may correspond to monetary denominations of only a few dollars since the examples could be in a foreign currency where very large numbers correspond in conversion to only a few U.S. dollars, and thus, indicating nano and micro-loans. For example, FIG. 16 shows a request for a pre-approved loan with the pre-approved amount shown of $25,000 (Block 450) followed by a request for the loan (Block 452) and the amounts that can be entered such as $1,000 and an amount repaid in 30 days, with an accepting of terms and conditions (Block 452). A notification is made that the loan has been delivered (Block 454). If the loans are paid back on time, the pre-approved amount will keep growing. At this time, a contract may be sent and more details about the loan at the email addressed of the user. At Block 452, the terms and conditions would be accepted that explain the contract and other terms and conditions.

Figure 17:
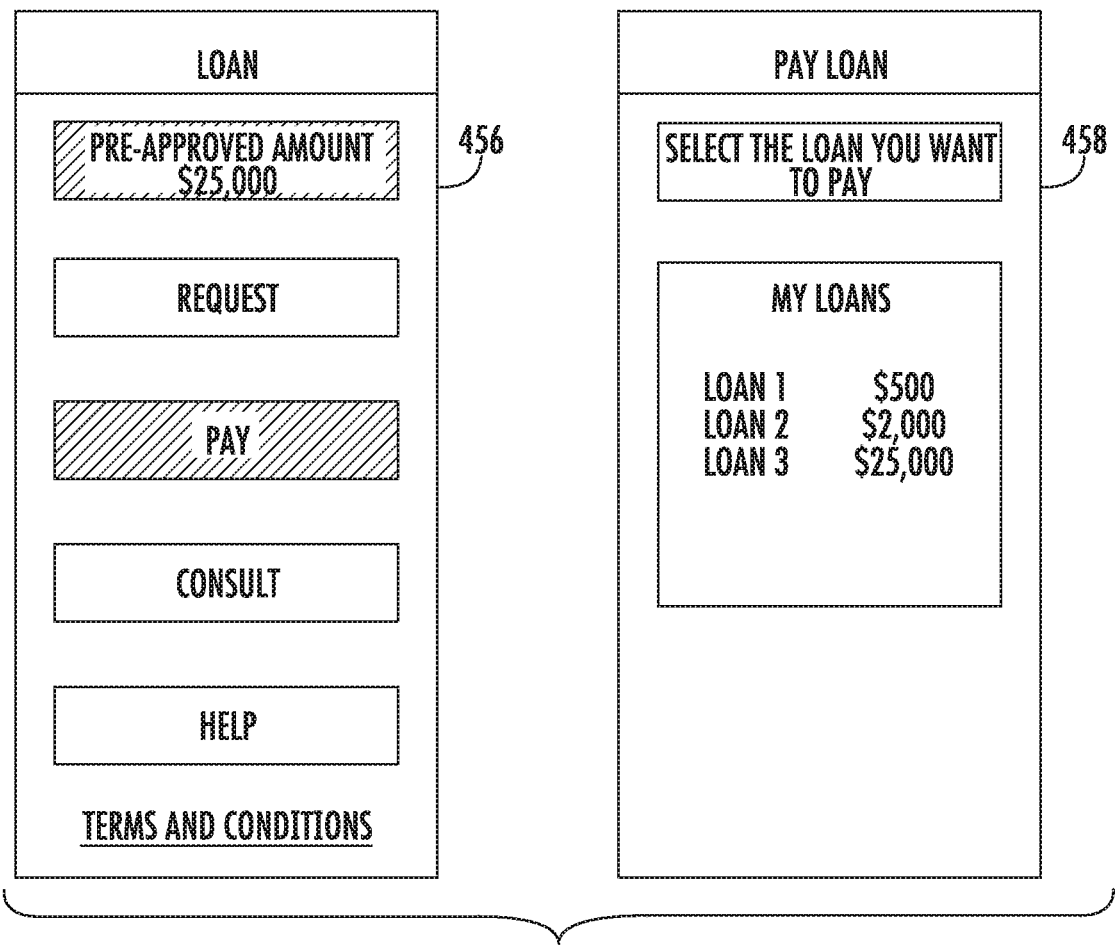
FIG. 17 are example wire frames of the application menu of FIG. 16 for paying a loan.

Referring now to FIGS. 17 and 18, the wire frames as potential screen shots are shown as paying the loan with the payment entry (Block 456) followed by the different loans shown as "my loans" with three different illustrated loans shown (Block 458). Loan 1 is shown (Block 460) in FIG. 18 with the amount, date, and the interest and the total to pay. Values can be entered for the amount to be paid with the successful payment (Block 462) shown and having a transaction number, date, time, and authorization number and reflecting the amount of the loan that has been paid.

Figure 19:
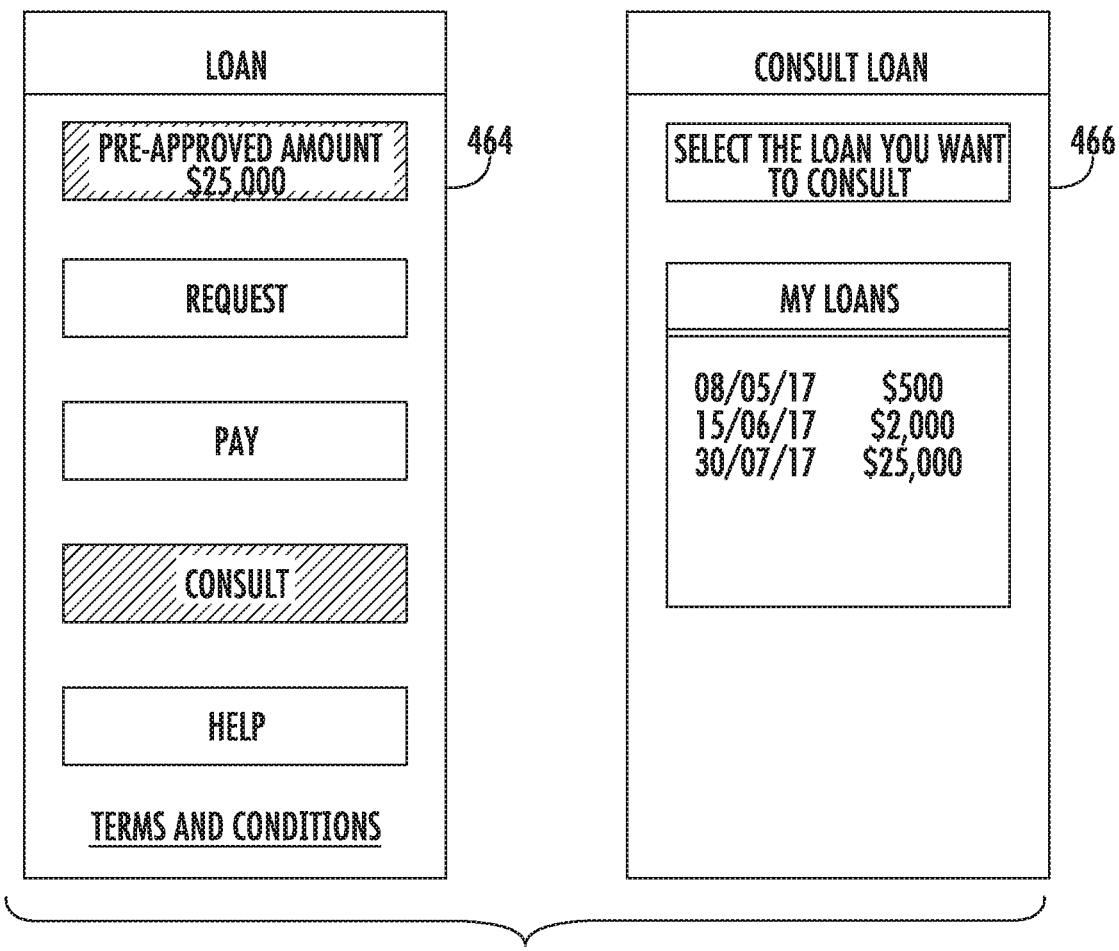
FIG. 19 are example wire frames of the application menu for consulting a loan.
Figure 20:
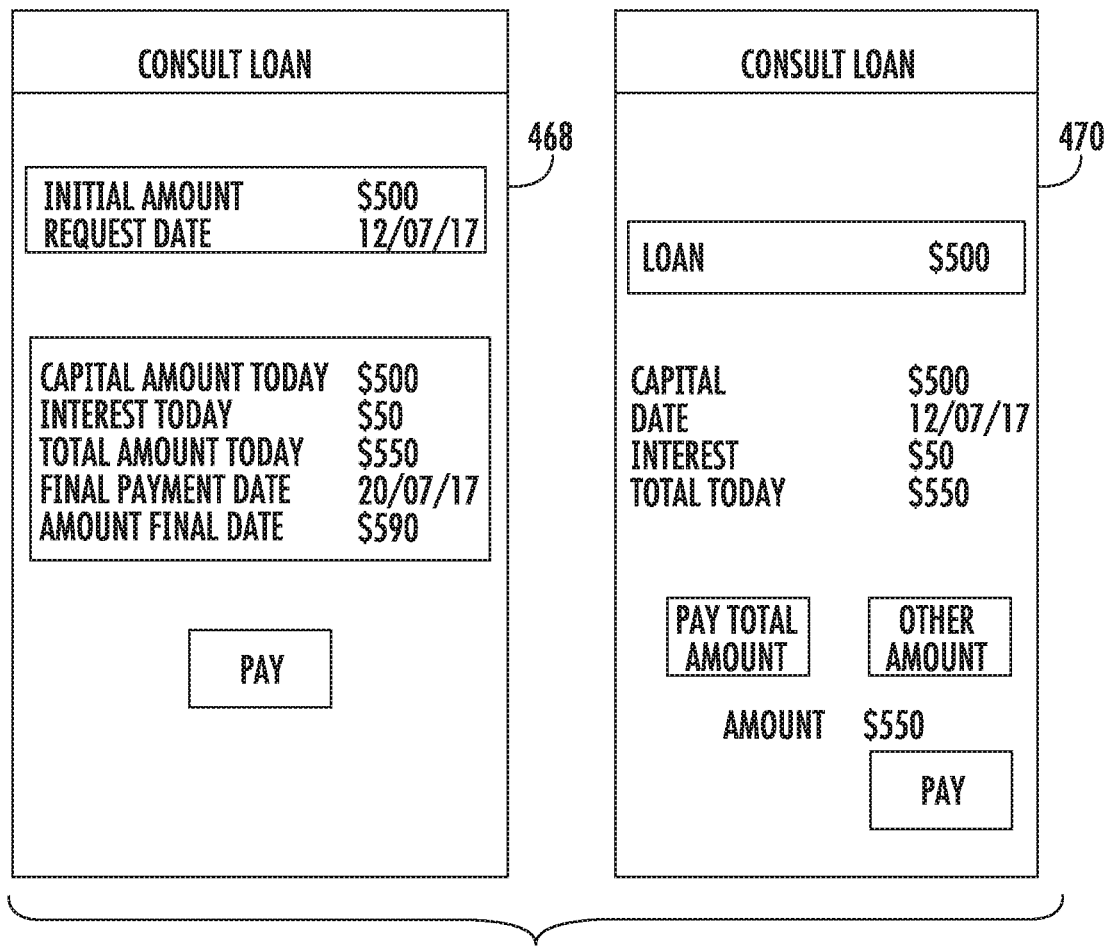
FIG. 20 are example wire frames of the application menu for consulting a loan.

Referring now to FIGS. 19 and 20, there are shown example wire frames for consulting a loan with the consulting block chosen for the pre-approved amount (Block 464) followed by the loan to be consulted and showing the different loans as "my loans" (Block 466) and reflecting the initial amount and showing the capital amount, interest today, total amount today, and final payment date with the amount of the final date and a pay selection (Block 468). This may be followed by the loan and whether the total amount is paid or another amount in the selection should be made for paying (Block 470).

Figure 22:
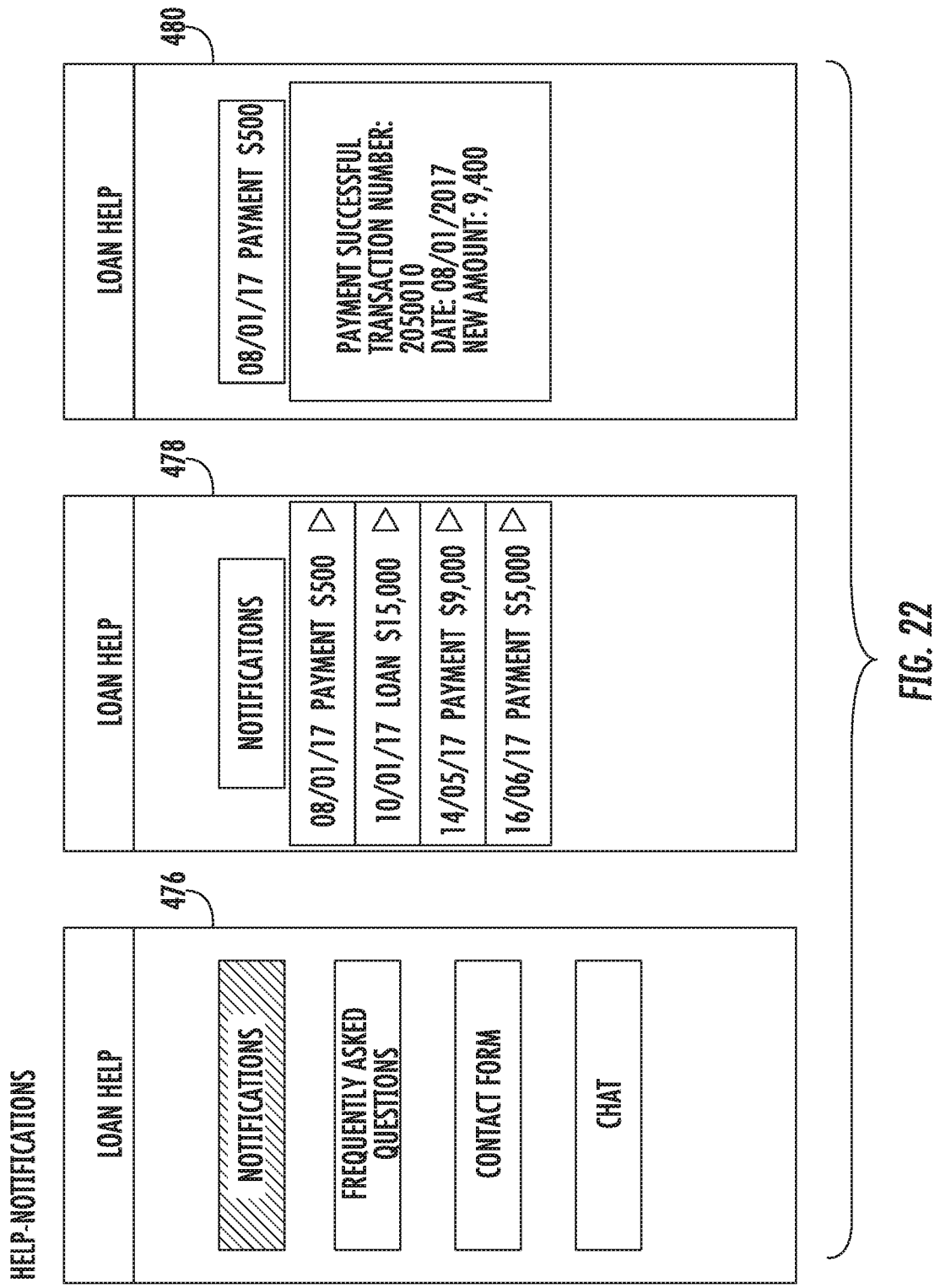
FIG. 22 are example wire frames of the application menu for notifications in a help menu.
Figure 23:
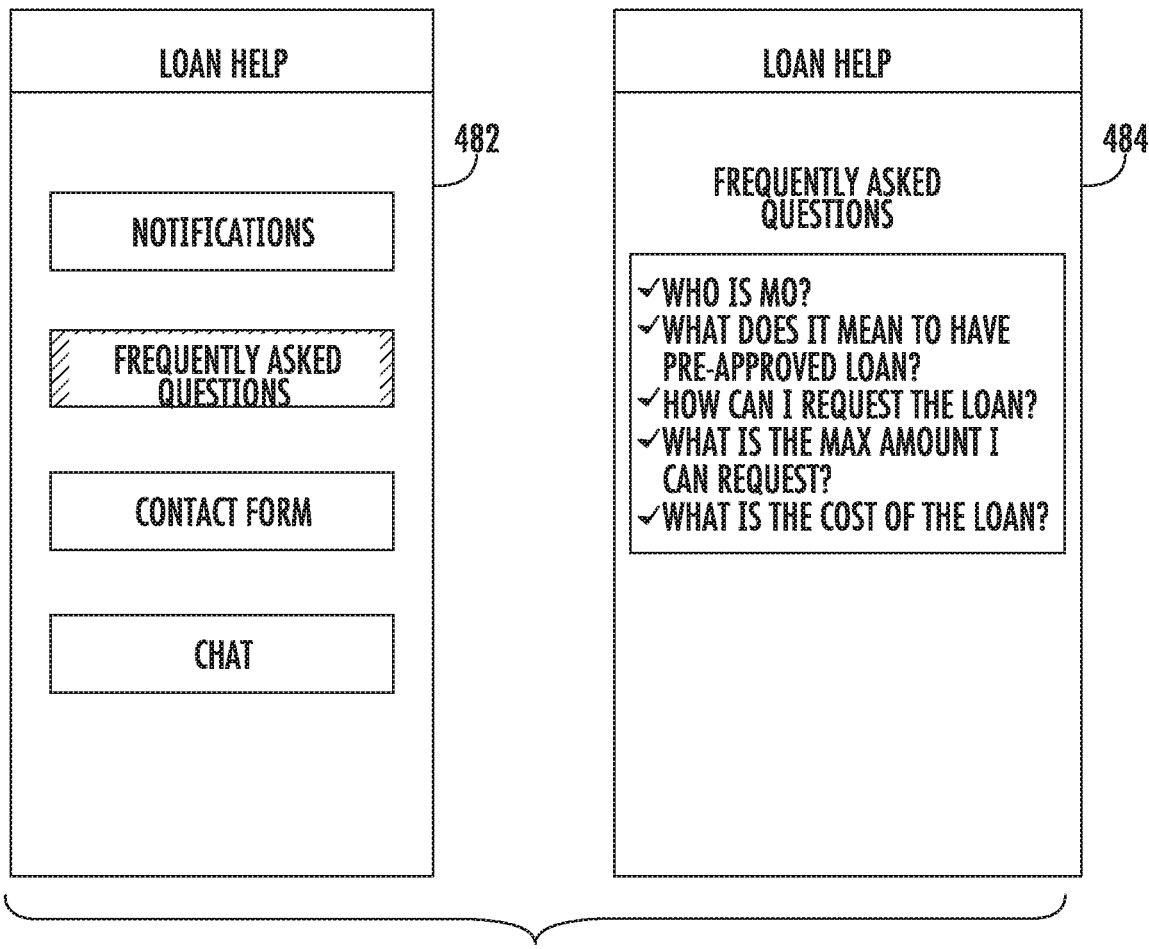
FIG. 23 are example wire frames of the application menu for frequently asked questions.
Figure 25:
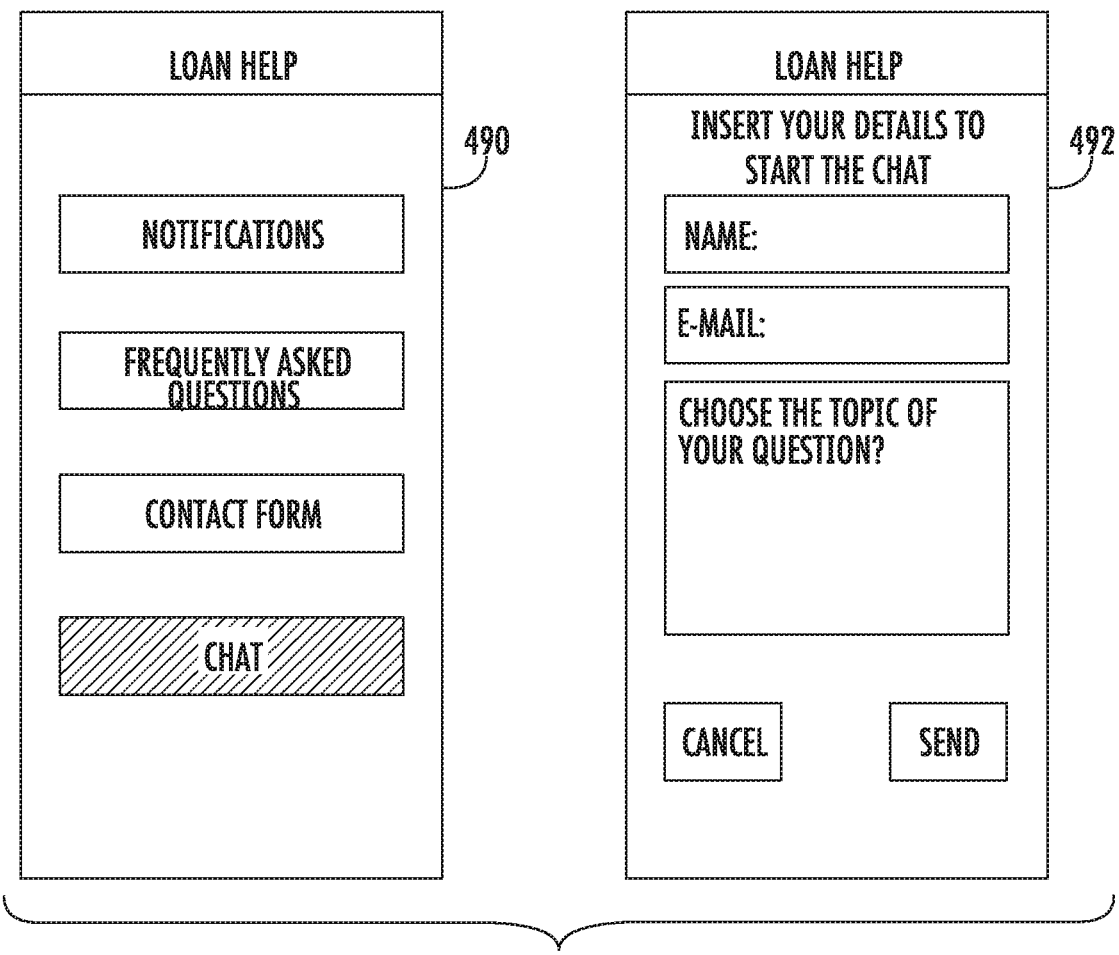
FIG. 25 are example wire frames of the application menu for a chat session.

Referring now to FIGS. 21-25, different wire frames for a help menu are illustrated with an initial menu (Block 472) followed by the loan help after the help button is selected (Block 472) and showing different notifications, frequently asked questions, a contact form and chat selections that a user can touch or select (Block 474). Different notifications are shown in FIG. 22 with an initial notification block selected (Block 476) and showing the different notifications for the different payments and loans (Block 478) and details about the first payment and its information and data (Block 480). Frequently asked questions are shown in FIG. 23 with the block selected (Block 482) and a selection of questions that can be selected (Block 484). The contact form is shown (Block 486) in FIG. 24 with the menu for contacting the MO system and its network administrator (Block 488). It is possible to chat with the network administrator by selecting the appropriate chat button in the help menu (Block 490) followed with information for chatting that can be entered by the user (Block 492).

Figure 26:
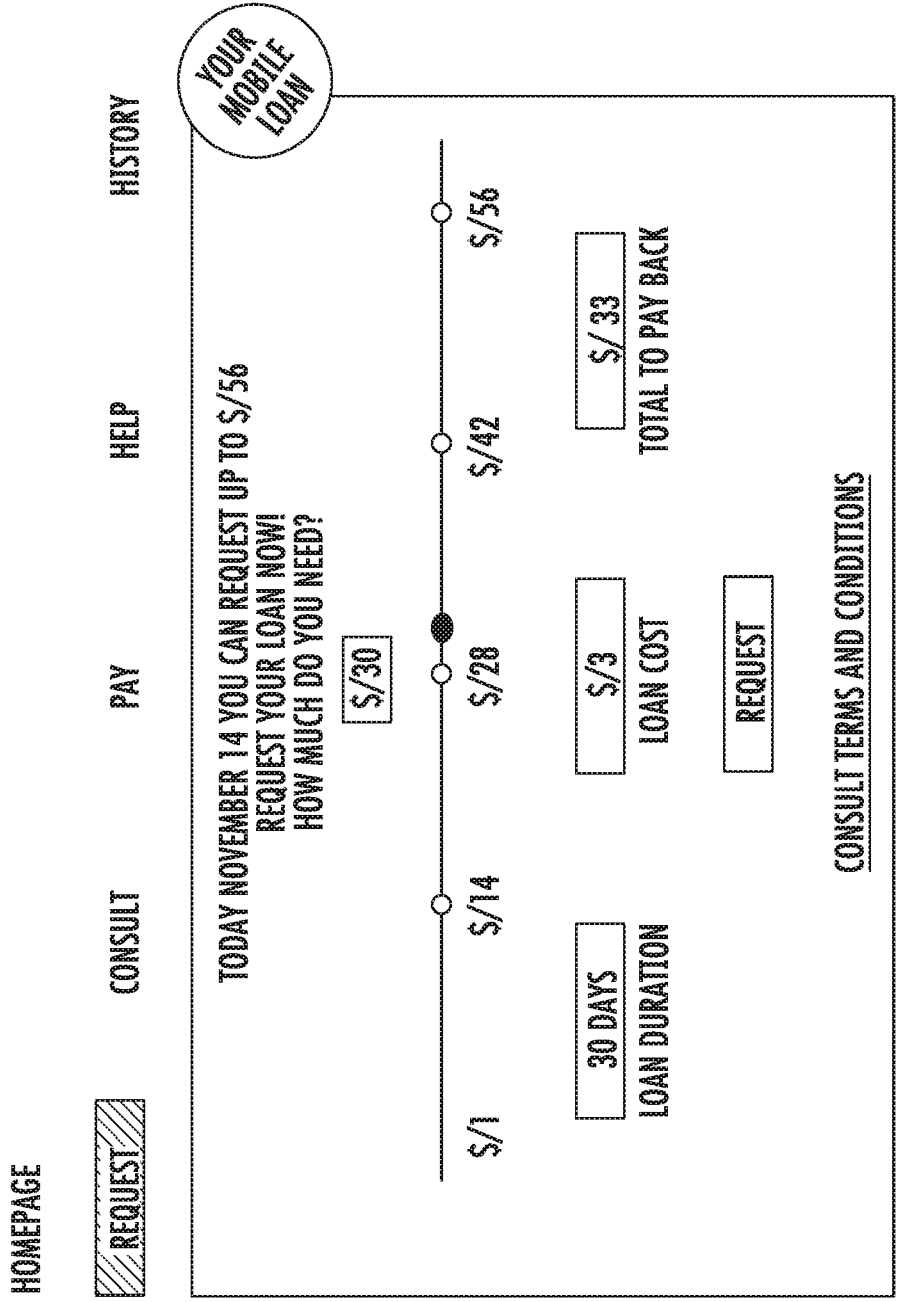
FIG. 26 is an example wire frame of the home page of a web portal using the loan issuance system of FIG. 1.
Figure 27:
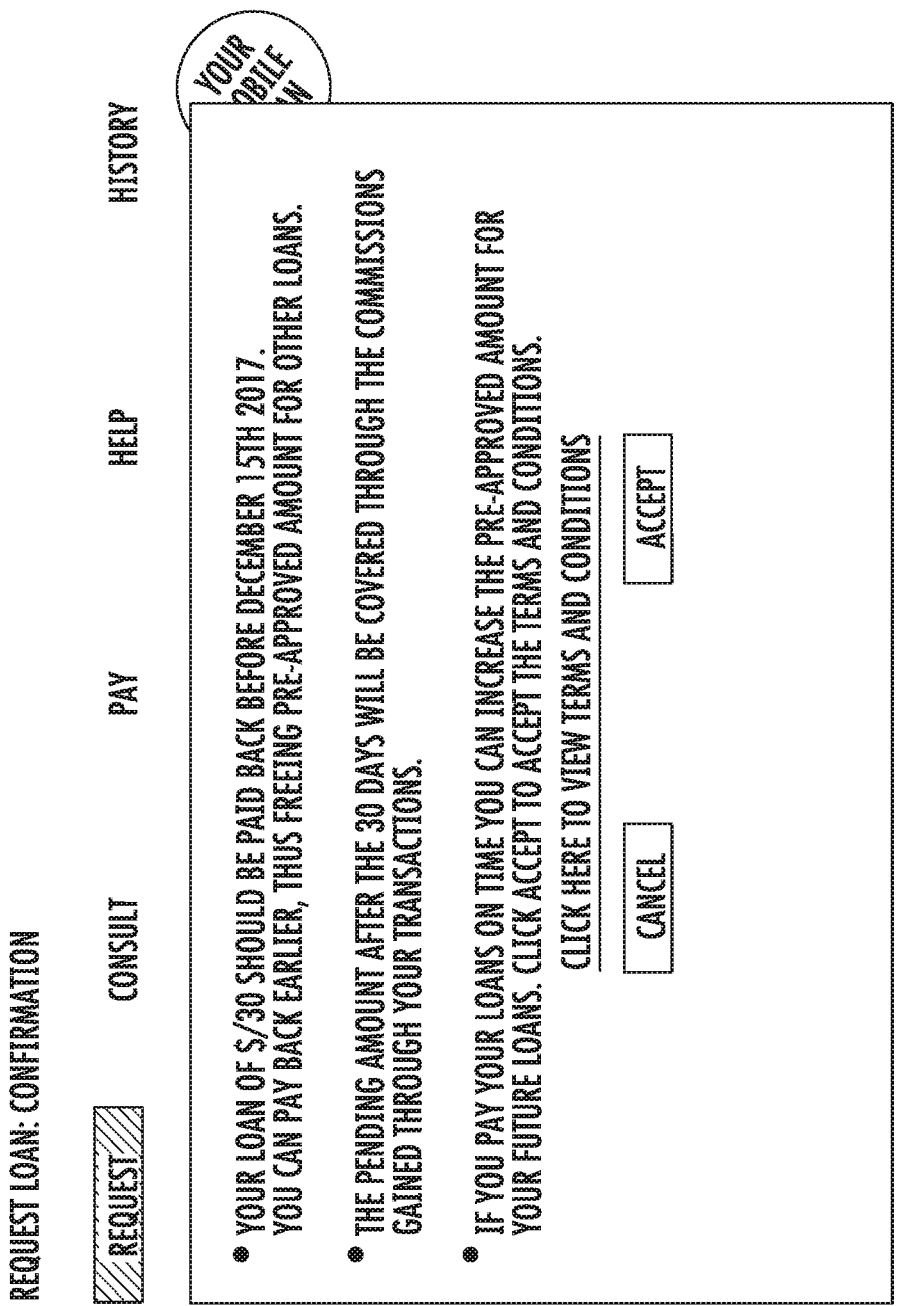
FIG. 27 is an example wire frame of the web portal for confirming a loan request.

Referring now FIGS. 26-39, there are illustrated wire frames for the potential screen shots for a web portal application such as for use on a personal computer via a conventional internet connection to the MO server operative as the MO system 101. Referring now to FIG. 26, there is shown an example home page with information regarding requesting a loan, how much is required, and the loan duration, cost and total to pay back and the request made. The confirmation of the loan request and information about pay back, information about late payments, and a requirement to accept the terms and conditions of potential increasing a pre-approved amount based on timely repayment is shown in FIG. 27.

Figure 28:
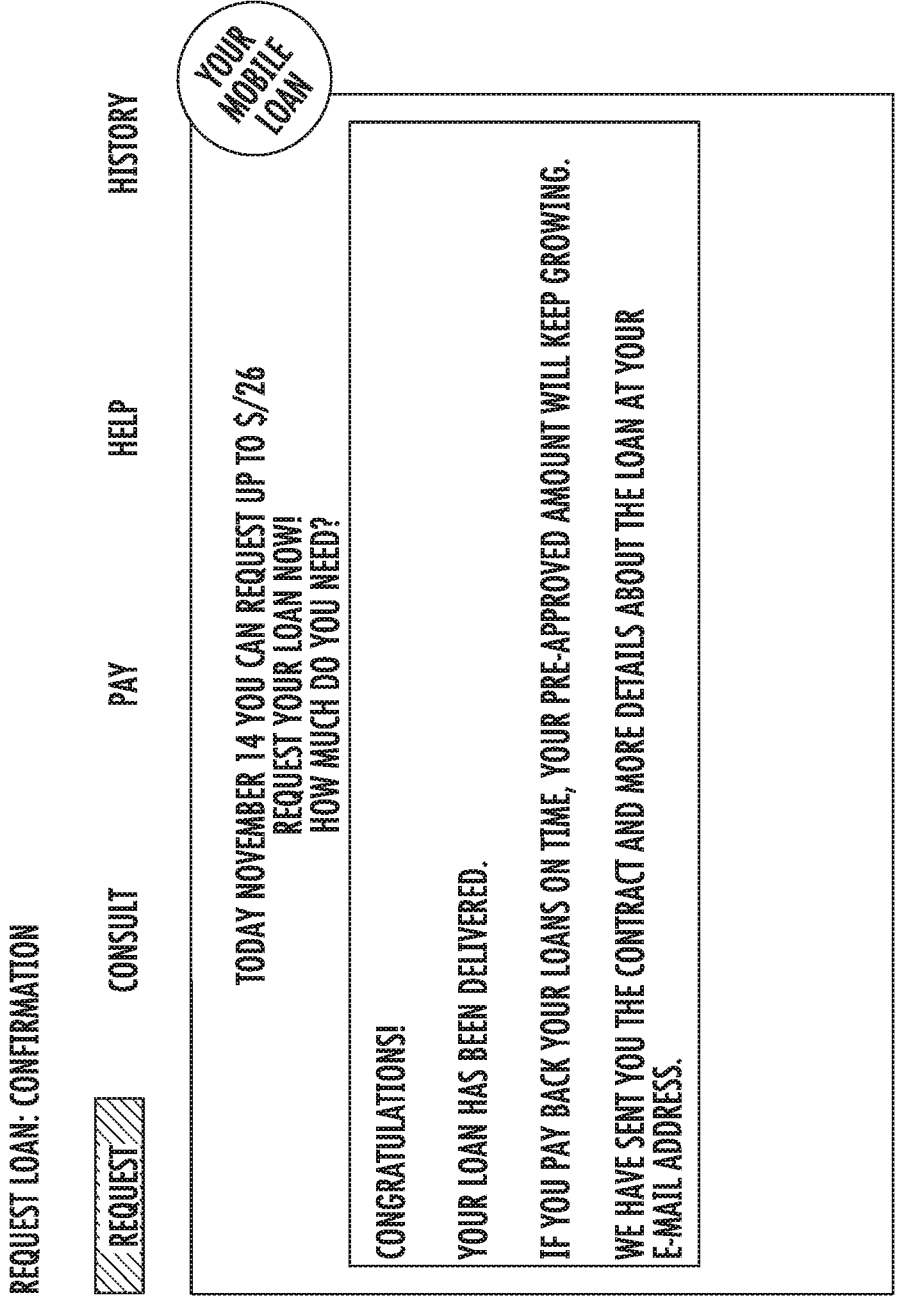
FIG. 28 is a further example wire frame of the web portal for confirming a loan request.
Figure 32:
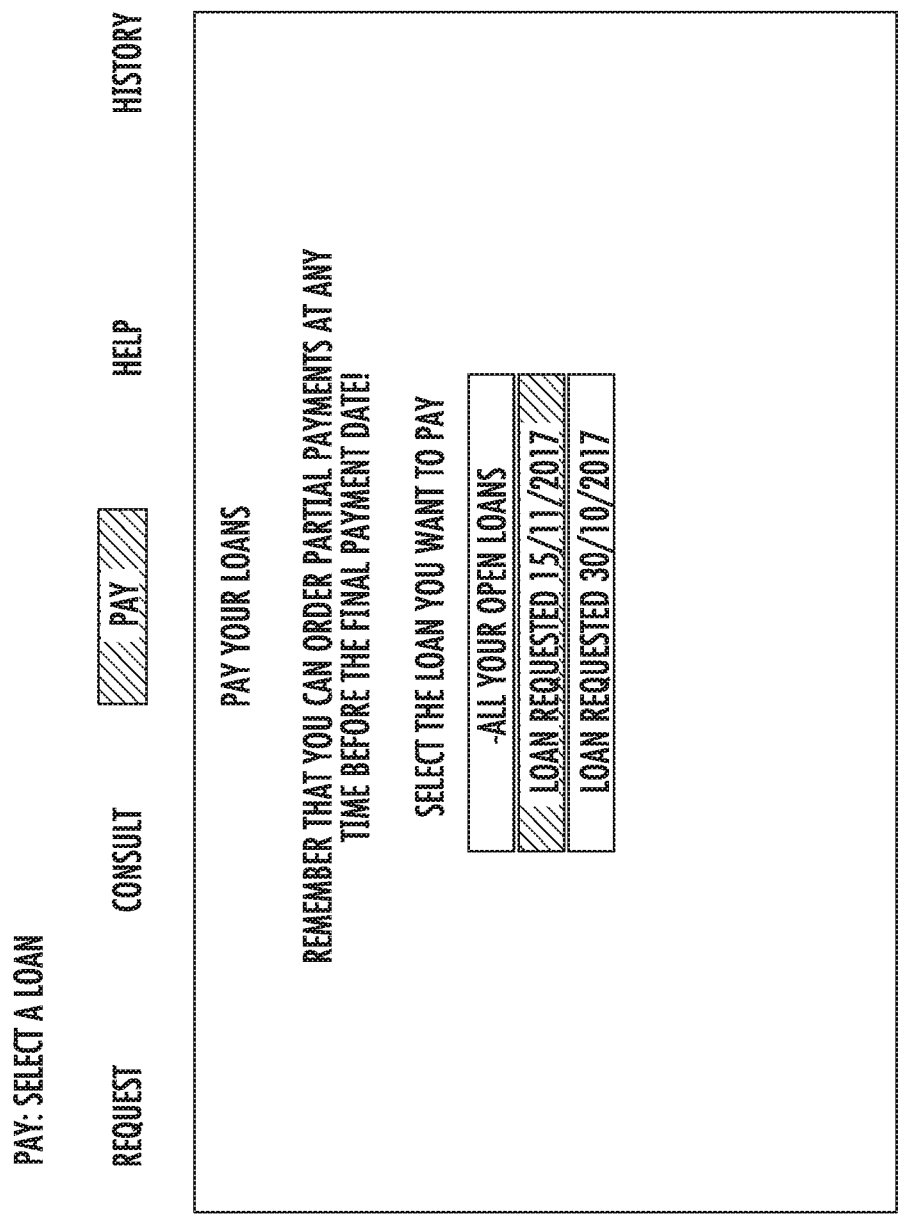
FIG. 32 is an example wire frame of the web portal for paying a selected loan.
Figure 34:
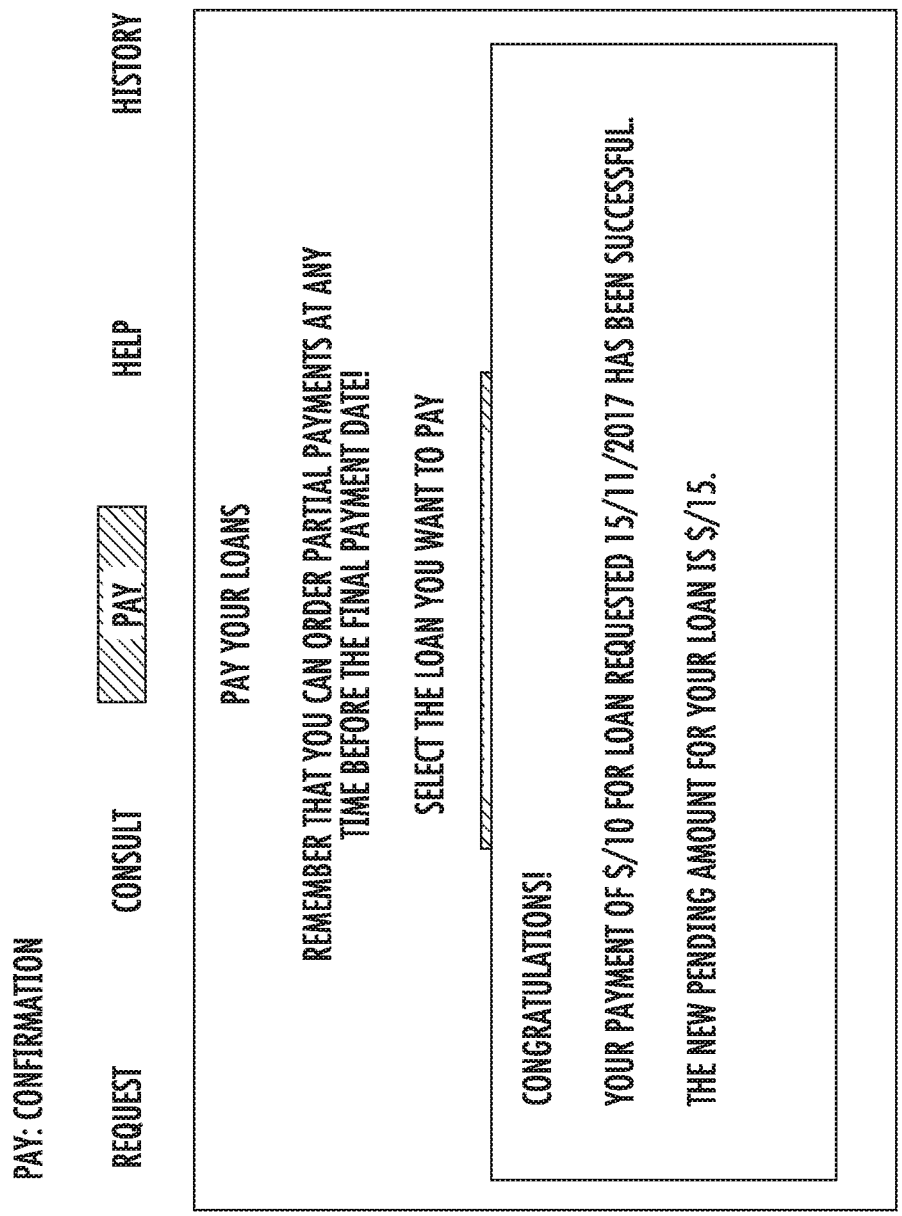
FIG. 34 is an example wire frame of the web portal for confirming the payment.
Figure 37:
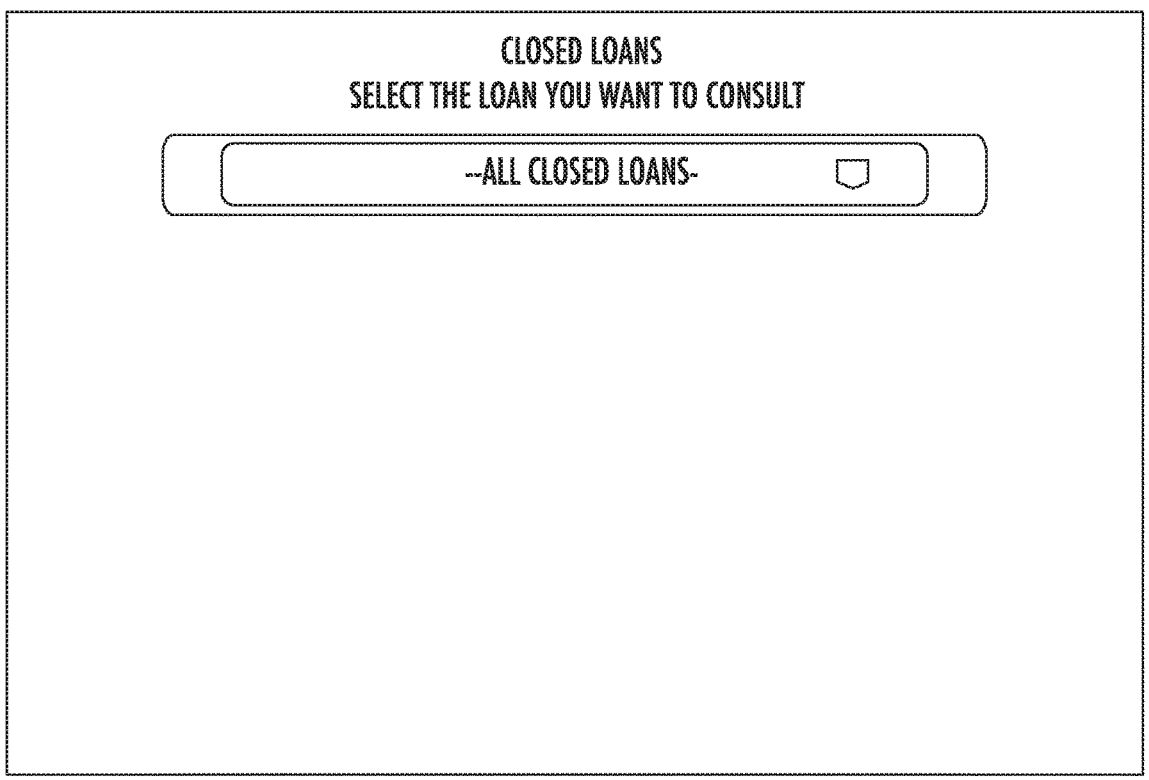
FIG. 37 is an example wire frame of the web portal for showing a history menu.
Figure 39:
FIG. 39 is an example wire frame of the web portal for the history menu and requesting a certificate.

Confirmation is shown in FIG. 28 with the information about delivering the loan such as to an e-wallet with information about the contract and details of the loan. A wire frame for consulting all loans is shown in FIG. 29 with a wire frame for selecting a loan to consult shown in FIG. 30 and a status of open loans shown at FIG. 31 with information as to the date, payment, new pending amount, final payment date, and other data. The loan selection is shown with possible partial payments that are indicated at FIG. 32 and the loan selected to pay in an amount at FIG. 33 and with a confirmation of payment in FIG. 34. The help menu is shown at FIG. 35 with frequently asked questions and answers to what is the MO system by indicating nano and micro-loans. The help menu shown at FIG. 36 and the closed loans shown at FIG. 37. The loan to consult is shown at FIG. 38 and showing the request for a closed loan certificate as part of the history for the closed loan that will be sent to the email addressed on file and stored at the system shown at FIG. 39.

Figure 40:
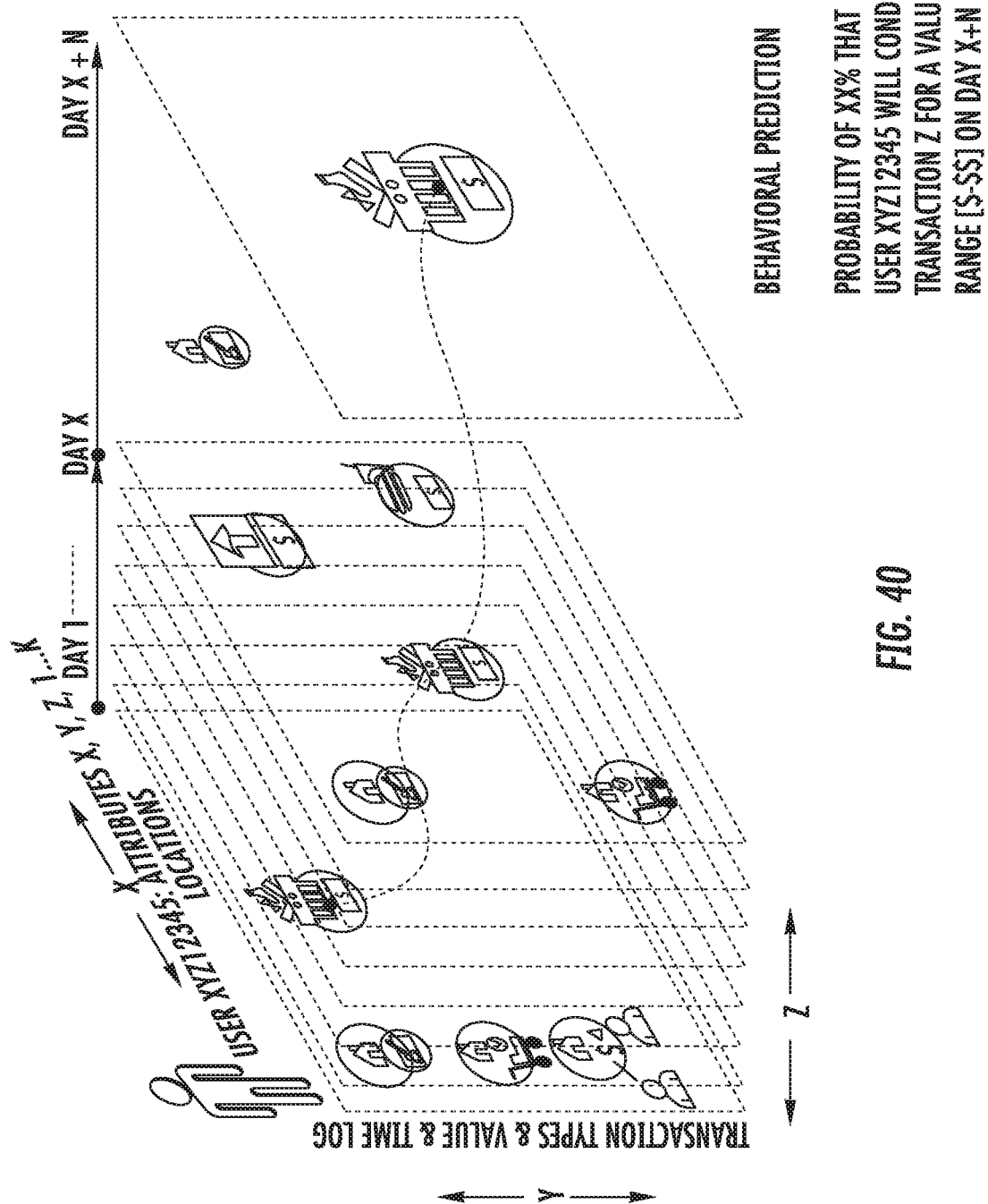
FIG. 40 is a fragmentary time graph for the behavioral prediction of a consumer using the loan issuance system of FIG. 1.

Referring now to FIG. 40, there is illustrated a time graph of behavioral prediction in accordance with a non-limiting example in which the system may generate a behavioral profile for the user based on the user check-ins to the e-wallet or transaction program that communicates with the MO system 101, server or processor having the rule engine. Based on the user location, the MO system 101 correlates the periodic location patterns to loan and transactional activities. The MO system 101 will match user location check-ins against, as an example, a known-locations database that includes data regarding stores, private locations, public places and other data, including transaction data, and correlate periodic location patterns to loan and transactional activities. Thus, the user profile and periodicity may be predicted for loan disbursement patterns, use of loans, loan repayments, and transaction activities.

In this three-dimensional time graph, the different attributes, including locations for a specific user, are shown along the X axis and the log of the transaction types and value and time are shown along the Y axis. Each day indicates the activities of the user along the Z axis so that known attributes, locations, transaction types, value and time are shown for each day up to day X. Thus each day would have certain types of transactions and the value of that particular transaction based on a store location with the user having basic attributes. These are correlated together.

Thus, it is possible to know the probability of a certain percentage that user XYZ12345 will conduct transaction Z for a monetary value range [$ to $$] on day X+N as shown in FIG. 40. Each day may include the user XYZ12345 visiting one or more specific stores, each at a specific location and conducting a specific transaction that is kept track of by the MO system. Based upon this information, it is possible to establish a behavioral prediction for the consumer as to a certain day and what type of transaction may occur at a possible store in a specific dollar range. Although this is only a probability of a certain percentage, the system allows this type of data and behavioral prediction to be used for each consumer, and thus, prediction patterns may be made for an individual consumer, sub-unit, or a large number of the consumers. This data could be provided to merchants and/or other large data vendors. Naturally, the consumer identity would be kept confidential as well as identifiers of mobile communication devices.

For example, the initial user profile generation and maximum credit determination as Phase I explained above permits the system to match the user attribute string to the user's database and apply the maximum credit for the user. The new user is recorded in the MO system data warehouse 108 and different attributes are profiled for a user such as the different loan activities. A record is kept of the transactional data from the e-wallet or transactional application via the API, which is imported once every few hours. The external data that is imported by a variety of public domain sources may be updated also and correlated to the different users.

Different transactional data may be recorded each day, such as each time the user uses the e-wallet or transactional application, such as the cash-in transactions with the type of cash-in, the location of the cash-in relative to a particular store, and the date and time. Cash-out transactions may also be kept as well as bill payment transactions, and more particularly, the purchase transactions with the amounts, type of purchase, location of purchase and the date and time. This is correlated with the log-in activities and sales transactions, including any money transfer transactions.

It is possible to use different types of behavioral prediction models and algorithms as learning methods that help generate the behavioral profiles to predict user profile and periodicity of the loan disbursement patterns, use of loans, loan repayments, and transaction activities. For example, it is possible to use Customer Conversation Modeling (CCM) that takes advantage of the consumer behavior data such as the buying trends, purchasing history, and including even social media activity that may be available publicly. It is possible to use a multi-threaded analysis of the consumer behavioral patterns such as customer churn, risk or acquisition prediction, and traditional tools that may include batch calculation of linear regression or classification models. A customer conversation modeling may enable the system to predict customer behavior before it happens and can focus on multi-threaded behavior such as trend detection for setting changes in behavior are more important than sustained behavior patterns, recognition of cyclical patterns that take into account the time and location, and the depth/breath of the historical interaction with the consumer in a multi-threaded pattern with alignment algorithms that track events across channels and align them in time and find correlation between multi-channel behavior.

It is possible to use fuzzy clustering, principal component analysis and discriminate analysis. Some techniques may include sequential pattern mining and association rule mining. It is also possible to use a weight factor and utility for effectual mining of significant association rules and even make use of a traditional Apriori algorithm to generate a set of association rules from a database and exploit the anti-monotone property of the Apriori algorithm. For a K-item set to be frequent, all (K−1) subsets of the item set may have to be frequent and a set of association rules may be mined and subjected to weight age (W-gain) and utility (U-gain) constraints. For every association rule that is mined, a combined utility weight score may be computed.

It is possible to use decision trees and other data mining techniques. Decision trees may split a large set of data into smaller classes and analyze where each level of the tree corresponds to a decision. The nodes and leaves may consist of a class of data that are similar to some target variables. There could be nominal (categorical and non-ordered), ordinal (categorical and ordered), and interval values (ordered values that can be averaged). The decision tree may have every leaf as a pure set and a tree may be split further until only pure sets are left as long as subsets do not become too small and give inaccurate results because of idiosyncrasies. One possible algorithm may be the ID3 or Iterative Dichotomiser 3 as a decision tree constructing algorithm that uses Entropy as a measure of how certain one can be that an element of a set is a certain type.

It is also possible to use different analytical techniques such as A/B/multivariate testing, visitor engagement and behavior targeting. Different advanced analytics may be applied such as customer segmentation that groups customers statistically together based on similar characteristics to help identify smaller and yet similar groups for targeted marketing opportunities. Basket segmentation would allow customer information to be provided through the contents of each transaction, while affinity and purchase path analysis would identify products that sell in conjunction with each other depending on promotional or seasonal basis and links between purchases over time. A marketing mix modeling would provide some response models from customer promotion campaigns and product propensity models and attrition models that predict customer behavior.

Other logistic regression and neural networks that include random force may use vector-based models that operate on feature vectors of fixed length as an input. The consumer histories are converted into a fixed set of features that may be crafted by domain experts and reflect indicators with a reliable set of features for prediction accuracy. Different iterations of empirical experiments may be used.

One possible technique would use recurrent neural networks (RNNs) to overcome vector-based methods that can be applied to a series of captured consumer actions and data that maintain a latent state that is updated with each action. One drawback of the vector-based machine learning similar to logistic regression is the requirement for domain knowledge and data-sign intuition and may include a necessary pre-processing that creates binary input vectors from original input data.

Signals that are encoded in the feature vector are picked up by the prediction model.

In contrast to vector-based methods, recurrent neural networks (RNNs) take sequences $X=(x_1, \ldots, x_T)$ of varying length T directly as inputs. RNNs may be built as connected sequences of computational cells. The cell at step t takes input $x_T$ and maintains a hidden state $h_t \in R^d$. This hidden state is computed from the input $x_T$ and the cell state at the previous time-step $h_{t-1}$ as $$h_t = \sigma(W_x x_t + W_h h_{t-1} + b),$$

where $W_x$ and $W_h$ are learned weight matrices, b is a learned bias vector and σ is the sigmoid function. It is possible to use a hidden state $h_t$ that captures data from the input sequence $(x_1, \ldots, x_T)$ up to a current time-step t. It is possible to prepare over time the data from early inputs. The dimensionality d of the hidden state may be a hyper-parameter that is chosen according to the complexity of the temporal dynamics of the scenario.

It is possible to use long short-term memory cells (LSTMs) that help preserve long-term dependencies and help maintain an additional cell state C for long-term memory. It would be possible to calculate any hidden and cell states ht and Ct using a cascade of gating operations:

$$ft = \sigma(Wf[ht-1, xt] + bf)$$

$$it = \sigma(Wi[ht-1, xt] + bi)$$

$$C't = \tan h(Wc[ht-1, xt] + bC)$$

$$Ct = ft\, Ct-1 + it\, C't$$

$$ot = \sigma(Wo[ht-1, xt] + bo)$$

$$ht = ot \tan h(Ct)$$

In this cascade, W and b may be learned weight matrices and bias vectors. The final hidden state hT may classify a sequence because hT may be input into a prediction network, which can be a simple linear layer or a sequence of non-linear layers.

There is a training period and the parameters W and b of the computational cells may be used to detect signals in the input sequences in order to help increase the prediction accuracy. Input sequences X are compressed by this process into suitable feature vectors hT. Often the compression process is viewed as feature learning from raw inputs and is the reason why work-intensive human feature engineering may not be required before applying the network. These models are complex and require a long processing time for the learning and predicting stages as compared to vector-based systems. Because there are more architectural choices and hyperparameters to tune, it may be more complex.

These are only non-limiting examples of a type of behavioral prediction analysis that may be accomplished using the system in accordance with a non-limiting example.

Many modifications and other embodiments of the invention will come to the mind of one skilled in the art having the benefit of the teachings presented in the foregoing That which is claimed is:

1. A method of determining the creditworthiness and issuing a micro- or nano loan to a consumer via a loan issuance system, generating a behavioral profile of the consumer and updating a maximum amount of the micro- or nanoloan to the consumer via the loan issuance system, wherein the loan issuance system comprises:

a first computing device comprising a mobile wireless communications device of the consumer and having a display and user interface;

a second computing device comprising a loan issuance server system having a communications module, a controller, and a relational attribute database connected thereto;

a third computing device separate from the second computing device and comprising a communications module, a processor, and non-relational transactional database connected thereto;

a wireless communications network connected to the mobile wireless communications device, the loan issuance server system, and third computing device, wherein said loan issuance server system includes a first application programming interface (API) operative to allow interaction between the loan issuance server system and the mobile wireless communications device and the third computing device, and said third computing device includes a second API operative to allow interaction between the loan issuance server system and the third computing device and the mobile wireless communications device, the method comprising:

a consumer selecting and connecting their mobile wireless communications device via the wireless communications network to the loan issuance server system via the first API, in response to the consumer's selecting and connecting to the loan issuance server system, the controller initiates via the first API a user interface on the display of the mobile wireless communications device, the user interface displaying a first menu item as a button selection on a portion of the display for requesting a micro- or nano loan, wherein the consumer selects the first menu item and initiates an API call as a request for a micro- or nano loan;

in response to the consumer selecting the first menu item and initiating the loan request, the loan issuance server system extracts N attributes about the consumer from external public data sources, wherein the N attributes have no personal identification data and confidential information about the consumer and comprise anonymous consumer transaction data extracted from transactional platforms and data extracted from one or more of a) gender, b) age, c) cellular operator, phone model, and usage, d) consumer geolocation, e) home values by geolocation, f) average income by: geolocation, gender and age groups, g) education by: geolocation and gender, h) public transport options by geolocation, i) social media activities by: geolocation, gender and age groups, j) infrastructure and services available by geolocation, and k) criminal records by geolocation, wherein the attributes are extracted from the external public data sources without obtaining a full name, a credit card number, a passport number, or a government issued ID number and other data that allows identification of the consumer;

processing the N attributes at the loan issuance server system by applying a features construction model and transforming data associated with the N attributes into a user attribute string associated with the consumer;

matching the user attribute string associated with the consumer with a pre-approved loan amount among a plurality of pre-approved loan amounts stored within the relational attribute database and generated from user attribute strings stored within the relational attribute database as associated with other consumers and that had been averaged into the plurality of different pre-approved loan amounts, said matching includes filtering by other users that match similar N attribute values: X user profile with N+Y to Z attributes of other stored users and their user attribute strings, wherein a match to a pre-approved loan amount based upon the user attribute strings stored within the relational attribute database is indicative of the micro- or nano loan amount as a maximum credit limit that is loaned to the consumer initially requesting the loan;

transmitting to the mobile wireless communications device via the communications module of the loan issuance server system a loan approval code indicative of the pre-approved loan amount, and in response to receiving the loan approval code at the mobile wireless communications device, displaying on the user interface a second menu item as button selections for confirming and selecting a micro- or nano loan amount up to the pre-approved loan amount and how the pre-approved loan is to be dispersed as either crediting an electronic wallet of the consumer or paying all or part of a bill associated with an account of the consumer in the value of the pre-approved loan;

in response to the consumer selecting the second menu item and confirming and selecting a micro- or nano loan amount up to the pre-approved loan amount and how the pre-approved loan is to be dispersed, the loan issuance server system credits the electronic wallet of the consumer or pays all or part of a bill associated with an account of the consumer based upon the consumer's selection at the second menu item, wherein the micro- or nano loan is approved and paid out on an average in under 20 seconds and with no more than three selections entered by the consumer on the mobile wireless communications device;

generating a user ID associated with the user attribute string of the consumer and storing the user ID and associated user attribute string in the relational attribute database of the loan issuance server system and in the non-relational transactional database of the separate third computing device;

acquiring at the third computing device additional transactional data linked to transactions made by the consumer over time via the second API, wherein the additional transactional data comprises data relating to a) customer transactions, b) cash out transactions, c) bill payment transactions, d) purchase transactions, e) cellular phone top ups, f) sales transactions, g) commission transactions, h) money transfer transactions, and i) other transactions obtained from an e-wallet or e-commerce platform of the consumer;

linking the additional transactional data of the consumer to the respective user ID and linked user attribute string belonging to the consumer and stored within the non-relational transactional database and transforming into a new user attribute string associated with the N attributes and linked additional transactional data, transferring the linked user ID and new user attribute string to the loan issuance server system; and applying a behavioral prediction and machine learning model to the new user attribute string of the consumer, wherein the behavioral prediction and machine learning model includes at least one of a customer conversation model and multi-threaded analysis model to generate a behavioral prediction for the consumer as a percentage value that the consumer will conduct transaction "Z" on day X+N at a known monetary value range, and based upon the behavioral prediction for the consumer associated with the specific user ID, update a maximum credit periodically.

2. The method according to claim 1, further comprising applying the behavioral prediction and machine learning model at the loan issuance server system using the multi-threaded analysis and predicting customer behavior based upon data comprising post-consumer buying trends, purchasing history, and public social media activities.

3. The method according to claim 1, further comprising applying the behavioral prediction and machine learning model at the loan issuance server system based on consumer segmentation with consumer information provided via the contents of each transaction and using affinity and purchase path analysis to identify products that sell in conjunction with each other depending on promotional and seasonal basis and linking between purchases over time.

4. The method according to claim 1, wherein the third computing device is configured to match the consumer check-ins and location for a consumer against a known-locations database within the non-relational transactional database at the third computing device, and comprising data regarding stores, private locations, public places and transaction data and correlating periodic location patterns to loan and transactional activities.

5. The method according to claim 4, further comprising predicting by consumer profile and periodicity,
loan disbursement patterns;
use of loans;
loan repayments; and
transaction activities.

6. A system of determining the creditworthiness and issuing a micro- or nano loan to a consumer, generating a behavioral profile of the consumer, and updating a maximum amount of the micro- or nanoloan to the consumer, the system comprising:
a first computing device comprising a mobile wireless communications device of the consumer and having a display and user interface;
a second computing device comprising a loan issuance server system having a communications module, a controller, and a relational attribute database connected thereto;
a third computing device separate from the second computing device and comprising a communications module, a processor, and non-relational transactional database connected thereto;
a wireless communications network connected to the mobile wireless communications device, the loan issuance server system, and third computing device, wherein said loan issuance server system includes a first application programming interface (API) operative to allow interaction between the loan issuance server system and the mobile wireless communications device and the third computing device, and said third computing device includes a second API operative to allow interaction between the loan issuance server system and the third computing device and with the mobile wireless communications device wherein:

in response to the consumer's selecting and connecting to the loan issuance server system, the loan issuance server system initiates via the API a user interface on a display of the mobile wireless communications device, the user interface displaying a first menu item as a button selection on a portion of the display for requesting a micro- or nano loan via the first menu item and initiating an API call as a request for a micro- or nano loan;

in response to the consumer selecting the first menu item and initiating the loan request, the loan issuance server system is configured to extract N attributes about the consumer from external public data sources, wherein the N attributes have no personal identification data and confidential information about the consumer and comprises anonymous consumer transaction data extracted from transactional platforms and data extracted from one or more of a) gender, b) age, c) cellular operator, phone model, and usage, d) consumer geolocation, e) home values by geolocation, f) average income by: geolocation, gender and age groups, g) education by: geolocation and gender, h) public transport options by geolocation, i) social media activities by: geolocation, gender and age groups, j) infrastructure and services available by geolocation, and k) criminal records by geolocation, wherein the N attributes are extracted from the external public data sources without obtaining a full name, a credit card number, a passport number, or a government issued ID number and other data that allows identification of the consumer, wherein the loan issuance server system is configured to:

process the N attributes at the loan issuance server system and apply a features construction model and transform data associated with the N attributes into a user attribute string associated with the consumer;

match the user attribute string associated with the consumer with a pre-approved loan amount among a plurality of pre-approved loan amounts stored within the relational attribute database and generated from user attribute strings stored within the relational attribute database as associated with other consumers that had been averaged into the plurality of different pre-approved loan amounts, and filter by other users that match similar N attribute values: X user profile with N+Y to Z attributes of other stored users and their user attribute strings, wherein a match to a pre-approved loan amount based upon user attribute strings stored within the relational attribute database is indicative of the micro- or nano loan amount as a maximum credit limit that is loaned to the consumer initially requesting the loan;

transmit to the mobile wireless communications device via the communications module of the loan issuance server system a loan approval code indicative of the pre-approved loan amount, and in response to receiving the loan approval code at the mobile wireless communications device, the mobile wireless communications device displays on the user interface a second menu item as button selections for confirming and selecting a micro- or nano loan amount up to the pre-approved loan amount and how the pre-approved loan is to be dispersed as either crediting an electronic wallet of the consumer or paying all or part of a bill associated with an account of the consumer in the value of the pre-approved loan amount;

in response to the consumer selecting the second menu item and confirming and selecting a micro- or nano loan amount up to the pre-approved loan amount and how the pre-approved loan is to be dispersed, the loan issuance server system credits the electronic wallet of the consumer or pays all or part of a bill associated with an account of the consumer based upon the consumer's selection at the second menu item, wherein the micro- or nano loan is approved and paid out on an average in under 20 seconds and with no more than three selections entered by the consumer on the mobile wireless communications device;

wherein said system is further configured to:

generate a user ID associated with the user attribute string of the consumer and store the user ID and associated user attribute string in the relational attribute database of the loan issuance server system and in the non-relational transactional database of the separate third computing device;

acquire at the third computing device additional transactional data linked to transactions made by the consumer over time via the second API, wherein the additional transactional data comprises data relating to a) customer transactions, b) cash out transactions, c) bill payment transactions, d) purchase transactions, e) cellular phone top ups, f) sales transactions, g) commission transactions, h) money transfer transactions, and i) other transactions obtained from an e-wallet or e-commerce platform of the consumer;

link the additional transactional data of the consumer to the respective user ID and linked user attribute string belonging to the consumer and stored within the non-relational transactional database and transform into a new user attribute string associated with the N attributes and linked additional transactional data, transfer the linked user ID and new user attribute string to the loan issuance server system; and apply a behavioral prediction and machine learning model to the new user attribute string of the consumer, wherein the behavioral prediction and machine learning model includes at least one of a customer conversation model and multi-threaded analysis model to generate a behavioral prediction for the consumer as a percentage value that the consumer will conduct transaction "Z" on day X+N at a known monetary value range, and based upon the behavioral prediction for the consumer associated with the specific user ID, update a maximum credit periodically.

7. The system according to claim 6, wherein said third computing device is configured to match consumer location and check-ins to at least one of the electronic wallet and the location of the consumer against a known-locations database incorporated with the non-relational transactional database of the third computing device and comprising data regarding stores, private locations, public places, and transaction data and correlating periodic location patterns to loan and transactional activities.

8. The system according to claim 7, wherein said loan issuance server system is configured to apply the behavioral prediction and machine learning model using a multi-threaded analysis and predicting customer behavior based upon data comprising post-consumer buying trends, purchasing history and public social media activities.

9. The system according to claim 7, wherein said loan issuance server system is configured to apply the behavioral prediction and machine learning model based on consumer segmentation with consumer information provided via the contents of each transaction and using affinity and purchase path analysis to identify products that sell in conjunction with each other depending on promotional and seasonal basis and linking between purchases over time.

10. The system according to claim 7, wherein said third computing device is configured to match consumer check-ins to at least one of the electronic wallet and the location for a consumer against a known-locations database comprising data regarding stores, private locations, public places and transaction data and correlating periodic location patterns to loan and transactional activities.

\* \* \* \* \*